United States Patent
Watanabe et al.

(10) Patent No.: US 11,536,687 B2
(45) Date of Patent: Dec. 27, 2022

(54) SENSOR ELEMENT AND GAS SENSOR

(71) Applicant: NGK INSULATORS, LTD., Aichi (JP)

(72) Inventors: Yusuke Watanabe, Nagoya (JP); Shiho Iwai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 255 days.

(21) Appl. No.: 16/819,921

(22) Filed: Mar. 16, 2020

(65) Prior Publication Data

US 2020/0309728 A1 Oct. 1, 2020

(30) Foreign Application Priority Data

Mar. 27, 2019 (JP) ............................ JP2019-060603

(51) Int. Cl.
*G01N 27/407* (2006.01)
*G01N 27/409* (2006.01)
(Continued)

(52) U.S. Cl.
CPC .......... *G01N 27/409* (2013.01); *G01N 27/301* (2013.01); *G01N 27/4067* (2013.01);
(Continued)

(58) Field of Classification Search
CPC ........... G01N 27/4071; G01N 27/4075; G01N 27/4076
See application file for complete search history.

(56) References Cited

U.S. PATENT DOCUMENTS

2015/0276657 A1* 10/2015 Sekiya ............... G01N 27/4072
204/424
2015/0276659 A1* 10/2015 Sekiya ............... G01N 27/4071
204/416

(Continued)

FOREIGN PATENT DOCUMENTS

| CN | 105474008 A | 4/2016 |
| JP | 2013-140175 A | 7/2013 |
| JP | 2018-173318 A | 11/2018 |

OTHER PUBLICATIONS

Unexamined U.S. Appl. No. 16/819,925, filed Mar. 16, 2020.
Chinese Office Action received in corresponding Chinese Application No. 202010185677.2 dated Jun. 6, 2022.

*Primary Examiner* — Alexander S Noguerola
(74) *Attorney, Agent, or Firm* — Mattingly & Malur, PC

(57) ABSTRACT

A sensor element includes an element body including an oxygen-ion-conductive solid electrolyte layer, the element body having a longitudinal direction, a measurement electrode disposed in the element body, a reference electrode disposed in the element body so as to come into contact with a reference gas, and a heater configured to heat the solid electrolyte layer. A center of gravity of the reference electrode overlaps the measurement electrode as viewed in a thickness direction of the solid electrolyte layer. A length of each of the reference electrode and the measurement electrode in a front-rear direction is less than or equal to 1.1 mm, the front-rear direction being a direction along the longitudinal direction of the element body. An area of the reference electrode as viewed in the thickness direction is greater than or equal to 1.0 mm$^2$.

9 Claims, 7 Drawing Sheets

(51) Int. Cl.
  *G01N 27/406*   (2006.01)
  *G01N 27/41*    (2006.01)
  *G01N 27/30*    (2006.01)
  *G01N 27/419*   (2006.01)

(52) U.S. Cl.
  CPC ..... *G01N 27/4072* (2013.01); *G01N 27/4075* (2013.01); *G01N 27/4076* (2013.01); *G01N 27/41* (2013.01); *G01N 27/419* (2013.01)

(56) References Cited

U.S. PATENT DOCUMENTS

2016/0209354 A1* 7/2016 Araki .................. G01N 27/409
2018/0284058 A1  10/2018 Watanabe et al.

* cited by examiner

SENSOR ELEMENT AND GAS SENSOR

The present application claims priority from Japanese Patent Application No. 2019-060603 filed on Mar. 27, 2019, the entire contents of which are incorporated herein by reference.

BACKGROUND OF THE INVENTION

1. Field of the Invention

The present invention relates to a sensor element and a gas sensor.

2. Description of the Related Art

Gas sensors are known in the related art for detecting a specific gas concentration such as NOx in a measurement-object gas such as an exhaust gas of an automobile. For example, PTL 1 describes a gas sensor. The gas sensor includes a layered body of a plurality of oxygen-ion-conductive solid electrolyte layers, and a plurality of electrodes disposed on the solid electrolyte layers. When the gas sensor detects the concentration of NOx, first, pumping-out or pumping-in of oxygen is performed between a measurement-object gas flow section within a sensor element and the outer side of the sensor element to adjust oxygen concentration within the measurement-object gas flow section. After the adjustment of oxygen concentration, NOx in the measurement-object gas is reduced around a measurement electrode. Then, oxygen around the measurement electrode is pumped out so that a voltage generated between the measurement electrode and a reference electrode in accordance with the oxygen concentration around the measurement electrode becomes constant, and, based on a pump current that flows during pumping-out of oxygen, the concentration of NOx in the measurement-object gas is detected.

CITATION LIST

Patent Literature

PTL 1: JP 2018-173318 A

SUMMARY OF THE INVENTION

A sensor element is used in a state of being heated to a temperature (e.g., 800° C.) at which solid electrolyte is active. At this time, if a thermoelectromotive force is generated due to the temperature difference between the reference electrode and the measurement electrode, a voltage between both electrodes includes the thermoelectromotive force, causing a problem of reduction in the detection accuracy of the specific gas concentration. For example, immediately after a heater starts heating the solid electrolyte layers, the thermoelectromotive force has an unstable value due to the temperature variations of the reference electrode and the measurement electrode. In a state where the thermoelectromotive force is unstable, the detection accuracy of the specific gas concentration is reduced. Even after the temperatures in the electrodes is stabilized, the steady thermoelectromotive force caused by the temperature difference between the reference electrode and the measurement electrode still exists, and the existence of the thermoelectromotive force may also reduce the detection accuracy of the specific gas concentration.

The present invention has been made to address the problems described above, and it is a main object of the present invention to shorten the stabilization time of the thermoelectromotive force between the reference electrode and the measurement electrode and to decrease the steady thermoelectromotive force.

To achieve the main object described above, the present invention is configured as follows.

The present invention provides a sensor element for detecting a specific gas concentration in a measurement-object gas, the sensor element including:

an element body including an oxygen-ion-conductive solid electrolyte layer, the element body having a longitudinal direction;

a measurement electrode disposed in the element body so as to come into contact with the measurement-object gas;

a reference electrode disposed in the element body so as to come into contact with a reference gas, the reference gas being used as a reference to detect the specific gas concentration in the measurement-object gas; and a heater disposed in the element body and configured to heat the solid electrolyte layer, wherein a center of gravity of the reference electrode overlaps the measurement electrode as viewed in a thickness direction of the solid electrolyte layer, a length of each of the reference electrode and the measurement electrode in a front-rear direction is less than or equal to 1.1 mm, the front-rear direction being a direction along the longitudinal direction of the element body, and an area of the reference electrode as viewed in the thickness direction is greater than or equal to 1.0 $mm^2$.

When in use, the sensor element is heated by the heater and is kept warm, and a voltage corresponding to an oxygen concentration difference between an area around the reference electrode and an area around the measurement electrode is generated between the reference electrode and the measurement electrode. The generated voltage is used to derive the specific gas concentration in the measurement-object gas. In the sensor element, the length of each of the reference electrode and the measurement electrode in the longitudinal direction of the element body, that is, in the front-rear direction, is less than or equal to 1.1 mm. This shortens the time from when the heater starts the heating operation to when the thermoelectromotive force between the measurement electrode and the reference electrode is stabilized. A direction perpendicular to the longitudinal direction and the thickness direction is represented as a width direction. Since the element body has a longitudinal direction, the temperature variations of the element body, when heated by the heater, in the longitudinal direction is larger than in the width direction. Accordingly, as the length of each of the reference electrode and the measurement electrode in the front-rear direction increases, the temperature variations of the electrode are more likely to increase, resulting in an increase in the time taken to make the temperatures in the electrode uniform. The length of each of the reference electrode and the measurement electrode is less than or equal to 1.1 mm, thereby making the temperatures in each electrode uniform more quickly. This shortens the time taken to stabilize the thermoelectromotive force between the measurement electrode and the reference electrode. In the sensor element, furthermore, the center of gravity of the reference electrode overlaps the measurement electrode, as viewed in the thickness direction of the solid electrolyte layer. Accordingly, the steady temperature difference between the reference electrode and the measurement electrode can be reduced, and the steady thermoelectromotive force between the reference electrode and the measurement electrode can be decreased. In a sensor element according to the present invention, therefore, it is possible to shorten the stabilization time of the thermoelectromotive force between the reference electrode and the measurement electrode and to decrease the steady thermoelectromotive force.

In the sensor element according to the present invention, a distance between the reference electrode and the measurement electrode in the thickness direction may be greater than or equal to 50 μm and less than or equal to 500 μm. When the distance between the reference electrode and the measurement electrode in the thickness direction is greater than or equal to 50 μm, a portion of the element body between the reference electrode and the measurement electrode is not excessively thin. Thus, a crack is less likely to occur in the element body. A distance of less than or equal to 500 μm in the thickness direction can further decrease the steady thermoelectromotive force between the reference electrode and the measurement electrode.

In the sensor element according to the present invention, the area of the reference electrode may be less than or equal to 4.0 mm². If the area of the reference electrode is excessively large, it takes time to make temperatures in the reference electrode uniform, which may result in an increase in the stabilization time of the thermoelectromotive force. When the area of the reference electrode is less than or equal to 4.0 mm², it is less likely to increase the stabilization time of the thermoelectromotive force.

In the sensor element according to the present invention, the length of the reference electrode may be greater than or equal to 0.5 mm. The length of the measurement electrode may be greater than or equal to 0.2 mm. The length of the measurement electrode may be less than or equal to 0.57 mm.

In the sensor element according to the present invention, the reference electrode may have a ratio Rr of greater than or equal to 0.2 and less than or equal to 0.8, the ratio Rr being a value obtained by dividing the length of the reference electrode in the front-rear direction by a length of the reference electrode in a width direction, the width direction being a direction perpendicular to the front-rear direction and the thickness direction. The measurement electrode may have a ratio Rm of greater than or equal to 0.2 and less than or equal to 0.8, the ratio Rm being a value obtained by dividing the length of the measurement electrode in the front-rear direction by a length of the measurement electrode in the width direction.

The present invention provides a gas sensor including:

the sensor element according to the present invention having any of the configurations described above;

the sensor element including a measurement-object-gas-side electrode disposed in or out of the element body so as to come into contact with the measurement-object gas, the element body having disposed therein a measurement-object gas flow section that allows the measurement-object gas to be introduced thereinto and to flow therethrough, the measurement electrode being disposed in a measurement chamber in the measurement-object gas flow section;

a reference gas regulating device that applies a control voltage between the reference electrode and the measurement-object-gas-side electrode to pump oxygen into around the reference electrode, the control voltage being repeatedly turned on and off; and a detection device that detects the specific gas concentration in the measurement-object gas on the basis of a voltage between the reference electrode and the measurement electrode during a second period among a first period and the second period, the first period being a period which begins in response to turning on of the control voltage and during which a potential difference between the reference electrode and the measurement-object-gas-side electrode is large, the second period being a period which begins in response to turning off of the control voltage and in which the potential difference has fallen relative to the potential difference during the first period.

In the gas sensor, the reference gas regulating device applies a control voltage between the reference electrode and the measurement-object-gas-side electrode to pump oxygen into around the reference electrode. This can compensate for the reduction in oxygen concentration around the reference electrode. In addition, since the reference gas regulating device applies a control voltage that is repeatedly turned on and off, the gas sensor has a first period during which the potential difference between the reference electrode and the measurement-object-gas-side electrode is large, and a second period in which the potential difference between the reference electrode and the measurement-object-gas-side electrode has fallen. During the second period, the control voltage less affects the potential of the reference electrode than during the first period. Accordingly, the detection device detects the specific gas concentration on the basis of the voltage between the reference electrode and the measurement electrode during the second period, thereby suppressing a reduction in the detection accuracy of the specific gas concentration. In the gas sensor, therefore, it is possible to suppress a reduction in the detection accuracy of the specific gas concentration caused by a control voltage for pumping-in while pumping oxygen into around the reference electrode. In the gas sensor, in addition, as described above, the area of the reference electrode is greater than or equal to 1.0 mm². This decreases the resistance value of the reference electrode and can thus decrease the residual voltage between the reference electrode and the measurement-object-gas-side electrode during the second period. Since the residual voltage affects the potential of the reference electrode, decreasing the residual voltage can suppress a reduction in the detection accuracy of the specific gas concentration.

In the gas sensor according to the present invention, the sensor element may further include an outer measurement electrode disposed on an outer side of the element body so as to come into contact with the measurement-object gas, the detection device may pump out oxygen, which is produced in the measurement chamber from the specific gas, from around the measurement electrode to around the outer measurement electrode, and detect the specific gas concentration on the basis of a measurement pump current that flows when the oxygen is pumped out, and an area of the measurement electrode as viewed in the thickness direction may be greater than or equal to 0.2 mm² and less than or equal to 2.0 mm². With this configuration, it is possible to detect the specific gas concentration on the basis of the measurement pump current. When the area of the measurement electrode is greater than or equal to 0.2 mm², the resistance value of the measurement electrode is not excessively large, resulting in an increase in the value of the measurement pump current and sufficient detection accuracy of the specific gas concentration. When the area of the measurement electrode is less than or equal to 2.0 mm², the resistance value of the measurement electrode is not excessively small, achieving a small offset current (the measurement pump current that flows when the measurement-object gas does not contain the specific gas).

In a case where the specific gas is an oxide, the "oxygen produced in the measurement chamber from the specific gas" may be oxygen produced when the specific gas itself is reduced in the measurement chamber. In a case where the specific gas is a non-oxide, the "oxygen produced in the measurement chamber from the specific gas" may be oxygen produced when a gas obtained by converting the specific gas into an oxide is reduced in the measurement chamber.

In the gas sensor according to the present invention, the sensor element may further include a measurement voltage detection unit that detects a measurement voltage that is the voltage between the reference electrode and the measurement electrode, a measurement pump cell including the measurement electrode and an outer measurement electrode disposed on an outer side of the element body so as to come into contact with the measurement-object gas, and a reference-gas regulating pump cell including the reference electrode and the measurement-object-gas-side electrode, the detection device may include the measurement pump cell, and a measurement pump cell controller that controls the measurement pump cell, the measurement pump cell controller may control the measurement pump cell on the basis of the measurement voltage obtained during the second period so that the measurement voltage obtained during the second period becomes a target voltage, obtain a measurement pump current that flows when the measurement pump cell pumps out oxygen, which is produced around the measurement electrode from the specific gas, from around the measurement electrode to around the outer measurement electrode in accordance with the control, and detect the specific gas concentration in the measurement-object gas on the basis of the measurement pump current, or may control the measurement pump cell so that the measurement pump current becomes a target current, and detect the specific gas concentration in the measurement-object gas on the basis of the measurement voltage obtained during the second period after the control is performed, and the reference gas regulating device may include the reference-gas regulating pump cell, and a reference-gas regulating pump cell controller that applies the control voltage to the reference-gas regulating pump cell.

DETAILED DESCRIPTION OF THE INVENTION

Figure 1:
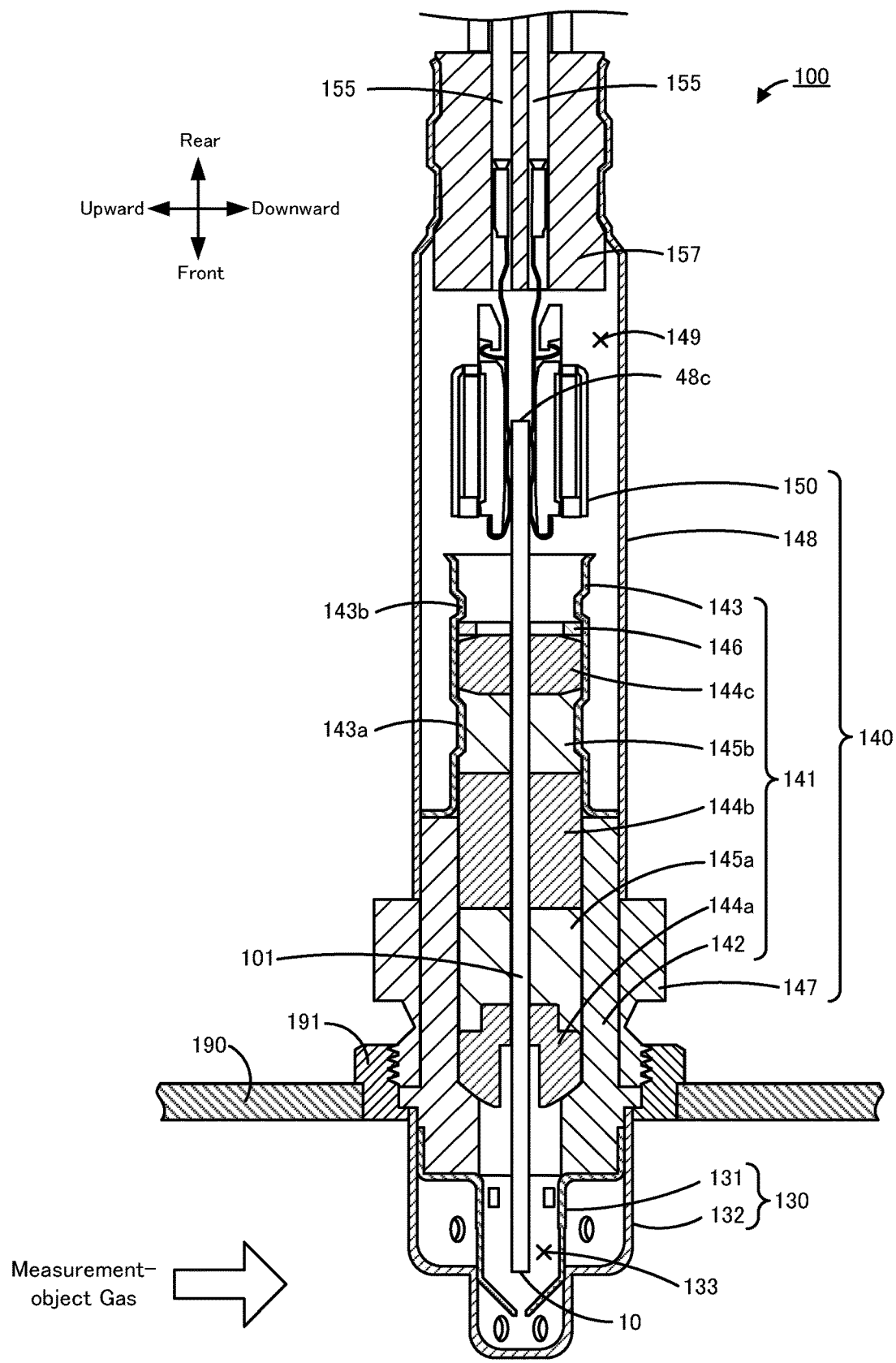
FIG. 1 is a longitudinal sectional view of a gas sensor 100.
Figure 2:
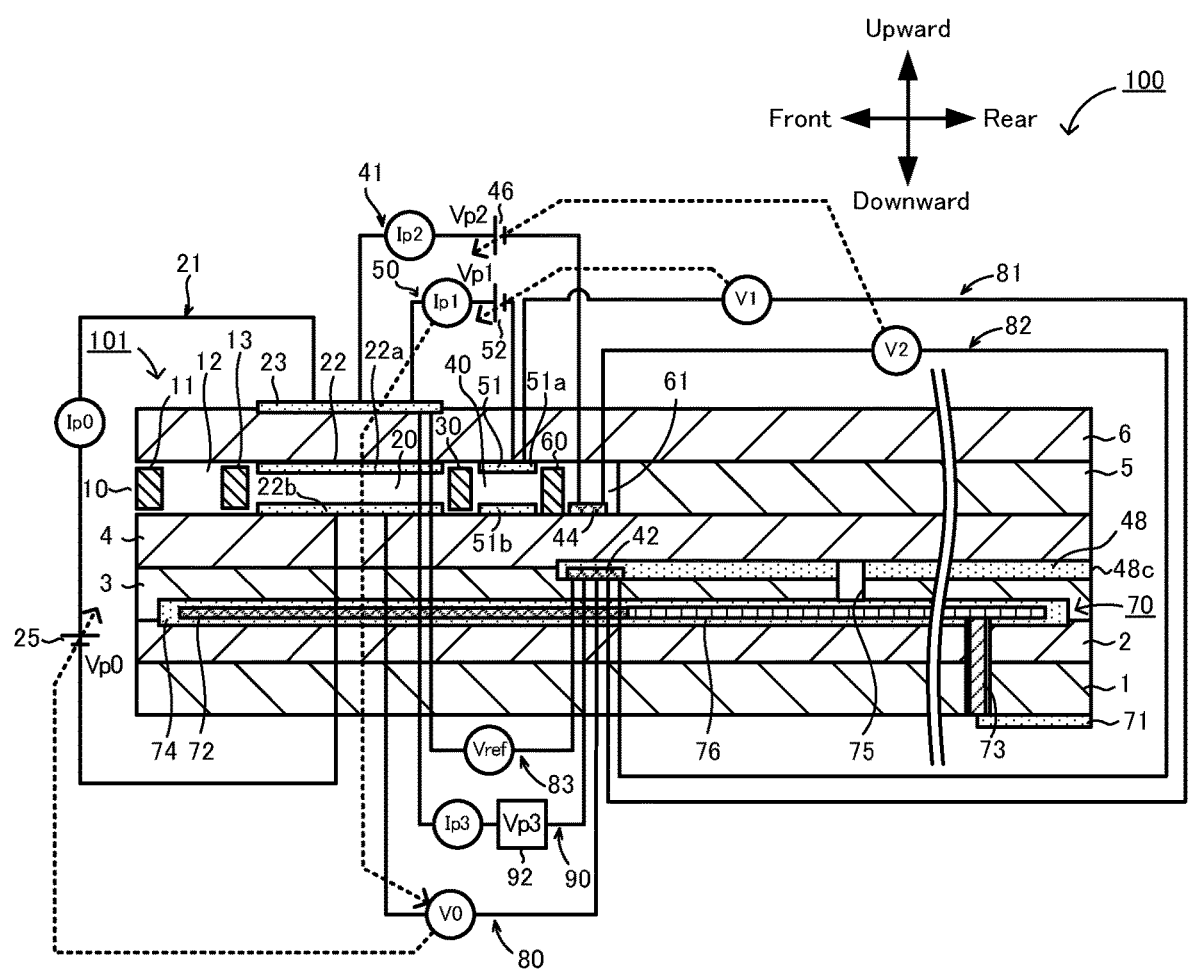
FIG. 2 is a schematic sectional view schematically illustrating an example configuration of a sensor element 101.

Next, an embodiment of the present invention will be described with reference to the drawings. FIG. 1 is a longitudinal sectional view of a gas sensor 100 according to an embodiment of the present invention. FIG. 2 is a schematic sectional view schematically illustrating an example configuration of a sensor element 101 included in the gas sensor 100. The sensor element 101 has a long, rectangular parallelepiped shape. The longitudinal direction of the sensor element 101 (left-right direction in FIG. 2) is represented as a front-rear direction, and the thickness direction of the sensor element 101 (up-down direction in FIG. 2) is represented as an up-down direction. The width direction of the sensor element 101 (direction perpendicular to the front-rear direction and the up-down direction) is represented as a left-right direction.

As illustrated in FIG. 1, the gas sensor 100 includes the sensor element 101, a protective cover 130 that protects the front end side of the sensor element 101, and a sensor assembly 140. The sensor assembly 140 includes a connector 150 having continuity with the sensor element 101. As illustrated in the drawing, the gas sensor 100 is attached to, for example, a pipe 190, such as an exhaust gas pipe of a vehicle, and is used to measure the concentration of a specific gas such as NOx or $O_2$ contained in an exhaust gas that is a measurement-object gas. In this embodiment, the gas sensor 100 is configured to measure NOx concentration as specific gas concentration.

The protective cover 130 includes a bottomed cylindrical inner protective cover 131 that covers a front end of the sensor element 101, and a bottomed cylindrical outer protective cover 132 that covers the inner protective cover 131. The inner protective cover 131 and the outer protective cover 132 have formed therein a plurality of holes through which the measurement-object gas flows into the protective cover 130. A sensor element chamber 133 is formed as a space surrounded by the inner protective cover 131. The front end of the sensor element 101 is arranged in the sensor element chamber 133.

The sensor assembly 140 includes an element sealing body 141 that seals the sensor element 101 in a fixed manner, a nut 147 attached to the element sealing body 141, an outer cylinder 148, and the connector 150. The connector 150 is in contact with connector electrodes (not illustrated) (only a heater connector electrode 71, which will be described below, is illustrated in FIG. 2) formed on surfaces (upper and lower surfaces) at a rear end of the sensor element 101 and is electrically connected to the connector electrodes.

The element sealing body 141 includes a cylindrical main metal fitting 142, a cylindrical inner cylinder 143 coaxially welded to the main metal fitting 142 in a fixed manner, ceramic supporters 144a to 144c sealed in through holes inside the main metal fitting 142 and the inner cylinder 143, green compacts 145a and 145b, and a metal ring 146. The sensor element 101 is located along the center axis of the element sealing body 141 in such a manner as to extend through the element sealing body 141 in the front-rear direction. The inner cylinder 143 has a reduced diameter portion 143a for pressing the green compact 145b in a direction toward the center axis of the inner cylinder 143, and a reduced diameter portion 143b for pressing the ceramic supporters 144a to 144c and the green compacts 145a and 145b to the front via the metal ring 146. The pressing forces from the reduced diameter portions 143a and 143b compress the green compacts 145a and 145b between the sensor element 101 and the set of the main metal fitting 142 and the inner cylinder 143. Accordingly, the green compacts 145a and 145b perform sealing between the sensor element chamber 133 in the protective cover 130 and a space 149 in the outer cylinder 148, and fix the sensor element 101.

The nut 147 is coaxially fixed to the main metal fitting 142, and has a male threaded portion formed on an outer peripheral surface thereof. The male threaded portion of the nut 147 is inserted into a fixing member 191 welded to the pipe 190. The fixing member 191 has a female threaded portion on an inner peripheral surface thereof. Accordingly, the gas sensor 100 is fixed to the pipe 190 in such a manner that a portion of the gas sensor 100 corresponding to the front end of the sensor element 101 and the protective cover 130 projects into the pipe 190.

The outer cylinder 148 surrounds the inner cylinder 143, the sensor element 101, and the connector 150. A plurality of lead wires 155, which are connected to the connector 150, are drawn out from a rear end of the outer cylinder 148. The lead wires 155 have continuity with electrodes (described below) of the sensor element 101 via the connector 150. A gap between the outer cylinder 148 and the lead wires 155 is sealed with a rubber stopper 157. The space 149 in the outer cylinder 148 is filled with a reference gas (in this embodiment, air). The rear end of the sensor element 101 is arranged in the space 149.

The sensor element 101 is an element including a layered body having six layers, each of which is formed of an oxygen-ion-conductive solid electrolyte layer such as a zirconia ($ZrO_2$) layer. The six layers include a first substrate layer 1, a second substrate layer 2, a third substrate layer 3, a first solid electrolyte layer 4, a spacer layer 5, and a second solid electrolyte layer 6, which are stacked in the stated order from bottom to top in the drawing. The solid electrolyte forming the six layers is dense and gas-tight. The sensor element 101 is manufactured by, for example, after performing predetermined processing and circuit pattern printing on ceramic green sheets, each corresponding to one of the layers, stacking the ceramic green sheets, firing the stacked ceramic green sheets, and combining the fired ceramic green sheets together to form a single unit.

At one end of the sensor element 101 (in the left-hand portion of FIG. 2), a gas inlet 10, a first diffusion control section 11, a buffer space 12, a second diffusion control section 13, a first internal cavity 20, a third diffusion control section 30, a second internal cavity 40, a fourth diffusion control section 60, and a third internal cavity 61 are formed adjacent and communicate in the stated order between a lower surface of the second solid electrolyte layer 6 and an upper surface of the first solid electrolyte layer 4.

The gas inlet 10, the buffer space 12, the first internal cavity 20, the second internal cavity 40, and the third internal cavity 61 are internal spaces of the sensor element 101, which are formed by hollowing a portion of the spacer layer 5, with the tops thereof defined by the lower surface of the second solid electrolyte layer 6, the bottoms thereof defined by the upper surface of the first solid electrolyte layer 4, and the sides thereof defined by the side surfaces of the spacer layer 5.

The first diffusion control section 11, the second diffusion control section 13, and the third diffusion control section 30 are each provided as two horizontally long slits (whose openings have a longitudinal direction along a direction perpendicular to the drawing). The fourth diffusion control section 60 is provided as a single horizontally long slit (whose opening has a longitudinal direction along a direction perpendicular to the drawing), which is formed as a gap from the lower surface of the second solid electrolyte layer 6. Note that the portion from the gas inlet 10 up to the third internal cavity 61 is also referred to as a measurement-object gas flow section.

An air introducing layer 48 is disposed between an upper surface of the third substrate layer 3 and a lower surface of the first solid electrolyte layer 4. The air introducing layer 48 is, for example, porous and composed of ceramics such as alumina. A rear end surface of the air introducing layer 48 is an inlet 48c, and the inlet 48c is exposed on a rear end surface of the sensor element 101. The inlet 48c is exposed in the space 149 illustrated in FIG. 1 (see FIG. 1). A reference gas used to measure NOx concentration is introduced into the air introducing layer 48 through the inlet 48c. In this embodiment, the reference gas is air (atmosphere in the space 149 illustrated in FIG. 1). The air introducing layer 48 is formed so as to cover a reference electrode 42. The air introducing layer 48 applies a predetermined diffusion resistance to the reference gas introduced through the inlet 48c and introduces the reference gas into the reference electrode 42. The thickness of the air introducing layer 48 may be a greater than or equal to 10 μm or less than or equal to 30 μm. The porosity of the air introducing layer 48 may be greater than or equal to 10% by volume or less than or equal to 50% by volume.

The reference electrode 42 is an electrode formed between the upper surface of the third substrate layer 3 and the first solid electrolyte layer 4, and is surrounded by the air introducing layer 48, as described above. The reference electrode 42 is formed directly on the upper surface of the third substrate layer 3 and is covered with the air introducing layer 48, except for a portion in contact with the upper surface of the third substrate layer 3. At least a portion of the reference electrode 42 may be covered with the air introducing layer 48. As described below, the reference electrode 42 can be used to measure the oxygen concentrations (oxygen partial pressures) in the first internal cavity 20, the second internal cavity 40, and the third internal cavity 61. The reference electrode 42 is formed as a porous cermet electrode (e.g., a cermet electrode composed of Pt and $ZrO_2$).

In the measurement-object gas flow section, the gas inlet 10 is a portion open to an external space such that the measurement-object gas is taken into the sensor element 101 from the external space through the gas inlet 10. The first diffusion control section 11 is a portion that applies a predetermined diffusion resistance to the measurement-object gas taken through the gas inlet 10. The buffer space 12 is a space provided to guide the measurement-object gas introduced from the first diffusion control section 11 to the second diffusion control section 13. The second diffusion control section 13 is a portion that applies a predetermined diffusion resistance to the measurement-object gas to be introduced into the first internal cavity 20 from the buffer space 12. When the measurement-object gas is introduced into the first internal cavity 20 from outside the sensor element 101, the measurement-object gas, which is rapidly taken into the sensor element 101 through the gas inlet 10 due to changes in the pressure of the measurement-object gas in the external space (pulsations in exhaust pressure when the measurement-object gas is an exhaust gas of an automobile), is not directly introduced into the first internal cavity 20, but is introduced into the first internal cavity 20 after the changes in the pressure of the measurement-object gas have been cancelled through the first diffusion control section 11, the buffer space 12, and the second diffusion control section 13. Consequently, the changes in the pressure of the measurement-object gas to be introduced into the first internal cavity 20 are almost negligible. The first internal cavity 20 is provided as a space for adjusting the oxygen partial pressure in the measurement-object gas introduced through the second diffusion control section 13. The oxygen partial pressure is adjusted by the operation of a main pump cell 21.

The main pump cell 21 is an electrochemical pump cell including an inner pump electrode 22 having a ceiling electrode portion 22a disposed over substantially an entire lower surface of a portion of the second solid electrolyte layer 6 that faces the first internal cavity 20, an outer pump electrode 23 disposed in a region corresponding to the ceiling electrode portion 22a on an upper surface of the second solid electrolyte layer 6 in such a manner as to be exposed to an external space (the sensor element chamber 133 in FIG. 1), and a portion of the second solid electrolyte layer 6 that is held between the electrodes 22 and 23.

The inner pump electrode 22 is formed across the upper and lower solid electrolyte layers defining the first internal cavity 20 (i.e., the second solid electrolyte layer 6 and the first solid electrolyte layer 4) and the spacer layer 5 forming the sidewall. Specifically, the ceiling electrode portion 22a is formed on the lower surface of the second solid electrolyte layer 6, which forms a ceiling surface of the first internal cavity 20. A bottom electrode portion 22b is formed directly on the upper surface of the first solid electrolyte layer 4, which forms a bottom surface of the first internal cavity 20. Side electrode portions (not illustrated) are formed on sidewall surfaces (inner surfaces) of the spacer layer 5, which form both sidewall portions of the first internal cavity 20, so as to connect the ceiling electrode portion 22a and the bottom electrode portion 22b to each other. The inner pump electrode 22 is thus disposed to have a tunnel structure in the portion where the side electrode portions are disposed.

The inner pump electrode 22 and the outer pump electrode 23 are each formed as a porous cermet electrode (e.g., a cermet electrode composed of Pt and $ZrO_2$ containing 1% Au). The inner pump electrode 22, which comes into contact with the measurement-object gas, is formed of a material having lowered reduction ability for the NOx component in the measurement-object gas.

In the main pump cell 21, a desired pump voltage Vp0 is applied between the inner pump electrode 22 and the outer pump electrode 23 to cause a pump current Ip0 to flow between the inner pump electrode 22 and the outer pump electrode 23 in the positive direction or the negative direction. Accordingly, the main pump cell 21 is capable of pumping oxygen out of the first internal cavity 20 to the external space or pumping oxygen into the first internal cavity 20 from the external space.

To detect the oxygen concentration (oxygen partial pressure) in the atmosphere in the first internal cavity 20, the inner pump electrode 22, the second solid electrolyte layer 6, the spacer layer 5, the first solid electrolyte layer 4, the third substrate layer 3, and the reference electrode 42 form an electrochemical sensor cell, that is, a main-pump-control oxygen-partial-pressure detection sensor cell 80.

An electromotive force V0 in the main-pump-control oxygen-partial-pressure detection sensor cell 80 is measured to determine the oxygen concentration (oxygen partial pressure) in the first internal cavity 20. In addition, the pump current Ip0 is controlled by performing feedback control of the pump voltage Vp0 of a variable power supply 25 so that the electromotive force V0 is kept constant. This can keep the oxygen concentration in the first internal cavity 20 at a predetermined constant value.

The third diffusion control section 30 is a portion that applies a predetermined diffusion resistance to the measurement-object gas whose oxygen concentration (oxygen partial pressure) is controlled in the first internal cavity 20 by the operation of the main pump cell 21 to guide the measurement-object gas into the second internal cavity 40.

The second internal cavity 40 is provided as a space for, after the adjustment of the oxygen concentration (oxygen partial pressure) in the first internal cavity 20 in advance, further adjusting, using an auxiliary pump cell 50, the oxygen partial pressure of the measurement-object gas introduced through the third diffusion control section 30. This can keep the oxygen concentration in the second internal cavity 40 constant with high accuracy and enables the gas sensor 100 to accurately measure the NOx concentration.

The auxiliary pump cell 50 is an auxiliary electrochemical pump cell including an auxiliary pump electrode 51 having a ceiling electrode portion 51a disposed over substantially the entire lower surface of the second solid electrolyte layer 6 that faces the second internal cavity 40, the outer pump electrode 23 (or any other suitable electrode on the outer side of the sensor element 101 in place of the outer pump electrode 23), and the second solid electrolyte layer 6.

The auxiliary pump electrode 51 has a tunnel structure similar to that of the inner pump electrode 22 disposed in the first internal cavity 20 described above, and is disposed in the second internal cavity 40. That is, the ceiling electrode portion 51a is formed on the second solid electrolyte layer 6, which forms a ceiling surface of the second internal cavity 40. A bottom electrode portion 51b is formed directly on the upper surface of the first solid electrolyte layer 4, which forms a bottom surface of the second internal cavity 40. Side electrode portions (not illustrated) are formed on both sidewall surfaces of the spacer layer 5, which form sidewalls of the second internal cavity 40, so as to connect the ceiling electrode portion 51a and the bottom electrode portion 51b to each other. Thus, the tunnel structure is provided. Like the inner pump electrode 22, the auxiliary pump electrode 51 is also formed of a material having lowered reduction ability for the NOx component in the measurement-object gas.

In the auxiliary pump cell 50, a desired voltage Vp1 is applied between the auxiliary pump electrode 51 and the outer pump electrode 23. Accordingly, the auxiliary pump cell 50 is capable of pumping out oxygen in the atmosphere in the second internal cavity 40 to the external space or pumping oxygen into the second internal cavity 40 from the external space.

To control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 form an electrochemical sensor cell, that is, an auxiliary-pump-control oxygen-partial-pressure detection sensor cell 81.

The auxiliary pump cell 50 performs pumping at a variable power supply 52 whose voltage is controlled on the basis of an electromotive force V1 detected by the auxiliary-pump-control oxygen-partial-pressure detection sensor cell 81. Accordingly, the oxygen partial pressure in the atmosphere in the second internal cavity 40 is controlled to a low partial pressure that does not substantially affect NOx measurement.

Additionally, a pump current Ip1 is used to control the electromotive force of the main-pump-control oxygen-partial-pressure detection sensor cell 80. Specifically, the pump current Ip1 is input as a control signal to the main-pump-control oxygen-partial-pressure detection sensor cell 80, for which the electromotive force V0 is controlled to perform control so that the gradient of the oxygen partial pressure in the measurement-object gas to be introduced into the second internal cavity 40 from the third diffusion control section 30 remains always constant. When the gas sensor 100 is used as a NOx sensor, the oxygen concentration in the second internal cavity 40 is kept at a constant value of approximately 0.001 ppm by the operation of the main pump cell 21 and the auxiliary pump cell 50.

The fourth diffusion control section 60 is a portion that applies a predetermined diffusion resistance to the measurement-object gas whose oxygen concentration (oxygen partial pressure) is controlled in the second internal cavity 40 by the operation of the auxiliary pump cell 50 to guide the measurement-object gas into the third internal cavity 61. The fourth diffusion control section 60 serves to limit the amount of NOx flowing into the third internal cavity 61.

The third internal cavity 61 is provided as a space for, after the adjustment of the oxygen concentration (oxygen partial pressure) in the second internal cavity 40 in advance, performing a process on the measurement-object gas introduced through the fourth diffusion control section 60 to measure the nitrogen oxide (NOx) concentration in the measurement-object gas. The measurement of the NOx concentration is mainly performed in the third internal cavity 61 by the operation of a measurement pump cell 41.

The measurement pump cell 41 measures the NOx concentration in the measurement-object gas in the third internal cavity 61. The measurement pump cell 41 is an electrochemical pump cell including a measurement electrode 44 disposed directly on the upper surface of the first solid electrolyte layer 4 that faces the third internal cavity 61, the outer pump electrode 23, the second solid electrolyte layer 6, the spacer layer 5, and the first solid electrolyte layer 4. The measurement electrode 44 is a porous cermet electrode (e.g., a cermet electrode of Pt and $ZrO_2$) composed of a material having higher reduction ability for the NOx component in the measurement-object gas than the material of the inner pump electrode 22. The measurement electrode 44 also functions as a NOx reducing catalyst for reducing NOx present in the atmosphere in the third internal cavity 61.

The measurement pump cell 41 is capable of pumping out oxygen, which is produced by decomposition of nitrogen oxides in the atmosphere around the measurement electrode 44, and detecting the amount of the produced oxygen as a pump current Ip2.

Further, to detect the oxygen partial pressure around the measurement electrode 44, the first solid electrolyte layer 4, the third substrate layer 3, the measurement electrode 44, and the reference electrode 42 form an electrochemical sensor cell, that is, a measurement-pump-control oxygen-partial-pressure detection sensor cell 82. A variable power supply 46 is controlled on the basis of an electromotive force (voltage V2) detected by the measurement-pump-control oxygen-partial-pressure detection sensor cell 82.

The measurement-object gas introduced into the second internal cavity 40, whose oxygen partial pressure has been controlled, passes through the fourth diffusion control section 60 and reaches the measurement electrode 44 in the third internal cavity 61. In the measurement-object gas around the measurement electrode 44, nitrogen oxides are reduced to produce oxygen ($2NO \rightarrow N_2 + O_2$). The produced oxygen is subjected to pumping by the measurement pump cell 41. In this process, a voltage Vp2 of the variable power supply 46 is controlled so that the voltage V2 detected by the measurement-pump-control oxygen-partial-pressure detection sensor cell 82 becomes constant. Since the amount of oxygen produced around the measurement electrode 44 is proportional to the concentration of nitrogen oxides in the measurement-object gas, the concentration of nitrogen oxides in the measurement-object gas is calculated using the pump current Ip2 of the measurement pump cell 41.

The second solid electrolyte layer 6, the spacer layer 5, the first solid electrolyte layer 4, the third substrate layer 3, the outer pump electrode 23, and the reference electrode 42 form an electrochemical sensor cell 83. The oxygen partial pressure in the measurement-object gas outside the sensor can be detected using an electromotive force (voltage Vref) obtained by the sensor cell 83.

Further, the second solid electrolyte layer 6, the spacer layer 5, the first solid electrolyte layer 4, the third substrate layer 3, the outer pump electrode 23, and the reference electrode 42 form an electrochemical reference-gas regulating pump cell 90. The reference-gas regulating pump cell 90 performs pumping by the flow of a control current Ip3 that is caused by a control voltage Vp3 applied by a power supply circuit 92 connected between the outer pump electrode 23 and the reference electrode 42. Accordingly, the reference-gas regulating pump cell 90 pumps oxygen into the space around the reference electrode 42 (the air introducing layer 48) from the space around the outer pump electrode 23 (the sensor element chamber 133 in FIG. 1).

In the gas sensor 100 having the configuration described above, the main pump cell 21 and the auxiliary pump cell 50 are activated to provide the measurement pump cell 41 with the measurement-object gas whose oxygen partial pressure is kept at a constant low value (value that does not substantially affect NOx measurement). Accordingly, the NOx concentration in the measurement-object gas can be determined on the basis of the pump current Ip2 caused to flow by the measurement pump cell 41 pumping out oxygen produced by reducing NOx approximately in proportion to the concentration of NOx in the measurement-object gas.

The sensor element 101 further includes a heater unit 70 that serves to perform temperature adjustment to heat the sensor element 101 and keep the sensor element 101 warm to enhance the oxygen ion conductivity of the solid electrolyte. The heater unit 70 includes a heater connector electrode 71, a heater 72, a through hole 73, a heater insulating layer 74, a pressure release hole 75, and a lead wire 76.

The heater connector electrode 71 is an electrode formed in contact with a lower surface of the first substrate layer 1. Connecting the heater connector electrode 71 to an external power supply allows external power feeding to the heater unit 70.

The heater 72 is an electric resistor formed to be vertically held between the second substrate layer 2 and the third substrate layer 3. The heater 72 is connected to the heater connector electrode 71 via the lead wire 76 and the through hole 73. The heater 72 generates heat in response to power fed thereto from outside through the heater connector electrode 71 to heat the solid electrolyte included in the sensor element 101 and keep the solid electrolyte warm.

The heater 72 is embedded across an entire area from the first internal cavity 20 to the third internal cavity 61 and is configured to adjust the entire sensor element 101 to a temperature at which solid electrolyte is active.

The heater insulating layer 74 is an insulating layer composed of porous alumina, which is formed of an insulating material such as alumina on upper and lower surfaces of the heater 72. The heater insulating layer 74 is formed to provide electrical insulation between the second substrate layer 2 and the heater 72 and electrical insulation between the third substrate layer 3 and the heater 72.

The pressure release hole 75 is a portion provided so as to extend through the third substrate layer 3 and the air introducing layer 48. The pressure release hole 75 is formed to mitigate an increase in internal pressure that is caused by a temperature rise in the heater insulating layer 74.

The variable power supplies 25, 46, and 52 and the power supply circuit 92 illustrated in FIG. 2 and the like are actually connected to the respective electrodes via lead wires (not illustrated) formed in the sensor element 101 and the connector 150 and the lead wires 155 illustrated in FIG. 1.

The following describes an example method for manufacturing the gas sensor 100. First, six unfired ceramic green sheets are prepared, each containing an oxygen-ion-conductive solid electrolyte such as zirconia as the ceramic component. A plurality of sheet holes used for positioning during printing or stacking, a plurality of required through holes, and the like are formed in the green sheets in advance. A space that forms the measurement-object gas flow section is provided in advance in the green sheet for the spacer layer 5 by punching or the like. Then, the ceramic green sheets are subjected to a pattern printing process and a drying process in accordance with the first substrate layer 1, the second substrate layer 2, the third substrate layer 3, the first solid electrolyte layer 4, the spacer layer 5, and the second solid electrolyte layer 6 to form various patterns on the respective ceramic green sheets. Specifically, the patterns to be formed are patterns for, for example, the respective electrodes described above, lead wires to be connected to the respective electrodes, the air introducing layer 48, and the heater unit 70. The pattern printing process is performed by applying pattern-forming paste, which is prepared according to the properties required for the respective objects to be formed, to the green sheets by using a known screen printing technique. The drying process is also performed using a known drying device. Upon completion of pattern printing and drying, an adhesive paste for stacking and bonding the green sheets corresponding to the respective layers is printed and dried. Then, a pressure bonding process is performed. Specifically, the respective green sheets with the adhesive paste formed thereon are positioned by aligning the sheet holes, stacked in a predetermined order, and then subjected to pressure bonding under predetermined temperature and pressure conditions to form a single layered body. The resulting layered body includes a plurality of sensor elements 101. The layered body is cut into the size of the sensor elements 101. Each of the cut pieces of the layered body is fired at a predetermined firing temperature to produce the sensor element 101.

After the sensor element 101 is obtained in the way described above, the sensor assembly 140 (see FIG. 1) with the sensor element 101 built therein is manufactured, and the components, such as the protective cover 130 and the rubber stopper 157, are mounted in the sensor assembly 140 to produce the gas sensor 100.

The functions of the reference-gas regulating pump cell 90 will now be described in detail. The measurement-object gas is introduced into the measurement-object gas flow section such as the gas inlet 10 in the sensor element 101 from the sensor element chamber 133 illustrated in FIG. 1. On the other hand, the reference gas (air) in the space 149 illustrated in FIG. 1 is introduced into the air introducing layer 48 of the sensor element 101. The sensor element chamber 133 and the space 149 are separated from each other by the sensor assembly 140 (the green compacts 145a and 145b, in particular) and are sealed to prevent gas from flowing therebetween. However, if the pressure of the measurement-object gas is large, the measurement-object gas may slightly enter the space 149. As a result, if the oxygen concentration around the reference electrode 42 is reduced, the reference potential, which is the potential of the reference electrode 42, may change. This may change a voltage based on the reference electrode 42, for example, the voltage V2 of the measurement-pump-control oxygen-partial-pressure detection sensor cell 82, and leads to a reduction in the detection accuracy of the NOx concentration in the measurement-object gas. The reference-gas regulating pump cell 90 serves to suppress such a reduction in detection accuracy. The reference-gas regulating pump cell 90 applies the control voltage Vp3 between the reference electrode 42 and the outer pump electrode 23 to cause the control current Ip3 to flow therebetween, thereby performing pumping-in of oxygen from around the outer pump electrode 23 to around the reference electrode 42. Accordingly, as described above, when the measurement-object gas decreases the oxygen concentration around the reference electrode 42, the reduced amount of oxygen can be compensated for, and a reduction in the detection accuracy of the NOx concentration can be suppressed.

Figure 3:
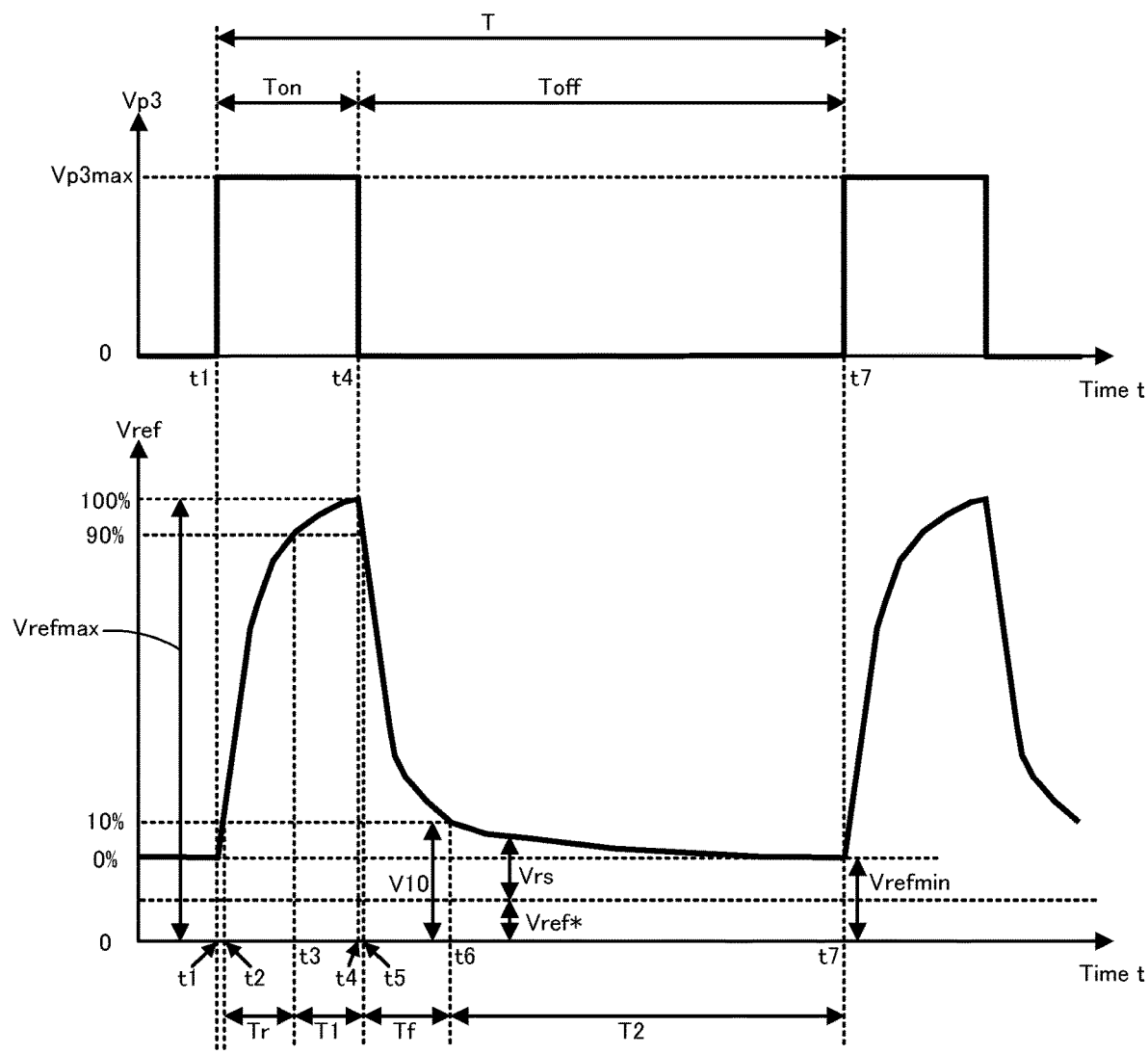
FIG. 3 is an explanatory diagram illustrating time changes of a control voltage Vp3 and a voltage Vref.

The power supply circuit 92 of the reference-gas regulating pump cell 90 applies, as the control voltage Vp3, a voltage that is repeatedly turned on and off. Accordingly, there are a first period and a second period. During the first period, the voltage Vref between the reference electrode 42 and the outer pump electrode 23 has a large value (=potential difference between the reference electrode 42 and the outer pump electrode 23). During the second period, the voltage Vref has a small value. FIG. 3 is an explanatory diagram illustrating time changes of the control voltage Vp3 and the voltage Vref. The upper part of FIG. 3 illustrates the time change of the control voltage Vp3, and the lower part of FIG. 3 illustrates the time change of the voltage Vref. The control voltage Vp3 and the voltage Vref are positive when the potential of the reference electrode 42 is higher than that of the outer pump electrode 23. In FIG. 3, the upward direction on the vertical axis represents the positive direction. As illustrated in FIG. 3, the control voltage Vp3 is a voltage having a pulse waveform that is repeatedly turned on and off in a cycle T. For example, when the control voltage Vp3 is turned on at time t1, the control voltage Vp3 rises from 0 V to a maximum voltage Vp3max and remains in the same state until time t4 at which an on time Ton elapses. When the control voltage Vp3 is turned off at time t4, the control voltage Vp3 remains at 0 V until time t7 at which an off time Toff elapses. In response to the control voltage Vp3, the voltage Vref starts to rise at time t1, reaching a maximum voltage Vrefmax at time t4, and starts to fall at time t4, reaching a minimum voltage Vrefmin at time t7. At this time, a difference between the maximum voltage Vrefmax and the minimum voltage Vrefmin of the voltage Vref, which is generated by turning the control voltage Vp3 on and off, is represented as 100%, which is used as a reference to determine a rise period, the first period, a fall period, and the second period of the voltage Vref. Specifically, a period during which the voltage Vref rises from 10% to 90% (time t2 to time t3) is represented as the rise period, and the length thereof is represented as a rise time Tr. A period during which the voltage Vref is greater than or equal to 90% (time t3 to time t5) is represented as the first period, and the length thereof is represented as a first time T1. A period during which the voltage Vref falls from 90% to 10% (time t5 to time t6) is represented as the fall period, and the length thereof is represented as a fall time Tf. A period from when the voltage Vref falls to 10% to when the voltage Vref starts to rise in response to the control voltage Vp3 being turned on in the next cycle (time t6 to time t7) is represented as the second period, and the length thereof is represented as a second time T2. The voltage Vref at the beginning of the second period, that is, the voltage obtained when the voltage Vref falls to 10%, is represented as a fall voltage V10. In FIG. 3, the voltage Vref becomes the maximum voltage Vrefmax for the first time at time t4 at which the control voltage Vp3 falls. However, if the on time Ton is long, the voltage Vref may reach the maximum voltage Vrefmax before time t4.

During the second period, the measurement pump cell 41 detects the NOx concentration in the measurement-object gas on the basis of the voltage V2. More specifically, during the second period, the measurement pump cell 41 obtains the value of the voltage V2 and performs feedback control of the voltage Vp2 of the variable power supply 46 so that the voltage V2 becomes a predetermined constant value (referred to as target value V2*) (i.e., so that the oxygen concentration in the third internal cavity 61 becomes a predetermined low concentration). Accordingly, oxygen is pumped out of the third internal cavity 61 such that oxygen produced by reducing NOx in the measurement-object gas in the third internal cavity 61 becomes substantially zero. Then, the measurement pump cell 41 detects the value of the pump current Ip2 caused to flow by the voltage Vp2. As described above, the measurement pump cell 41 detects the NOx concentration (here, the pump current Ip2) during the second period, thereby making it possible to suppress the reduction in the detection accuracy of the NOx concentration caused by the control voltage Vp3 for pumping-in of oxygen to the measurement electrode 44. For example, consideration is given to a case where the measurement pump cell 41 measures the NOx concentration during the first period. In this case, unlike the second period, the control voltage Vp3 is in on state during the first period, and thus the voltage Vref is changed to a value higher than the voltage Vref*, which is the value obtained otherwise (voltage based on an oxygen concentration difference between an area around the reference electrode 42 and an area around the outer pump electrode 23). Accordingly, the potential of the reference electrode 42 changes, and the voltage V2 also changes. Thus, if the measurement pump cell 41 causes the pump current Ip2 to flow on the basis of the voltage V2 during the first period, the pump current Ip2 is likely to deviate from the correct value representing the NOx concentration, and a reduction in the detection accuracy of the NOx concentration is likely to occur. During the second period, in contrast, the control voltage Vp3 less affects the potential of the reference electrode 42 than during the first period. Specifically, the voltage Vref during the second period after the voltage Vref falls is a value closer to the voltage Vref* than the voltage Vref during the first period. Thus, the measurement pump cell 41 measures the NOx concentration during the second period, thereby suppressing a reduction in the detection accuracy of the NOx concentration. To be precise, the voltage Vref* inevitably includes the thermoelectromotive force generated between the outer pump electrode 23 and the reference electrode 42.

As seen from FIG. 3, the voltage Vref decreases for a certain amount of time from the timing at which the control voltage Vp3 is turned off. Such a decrease in the voltage Vref is considered to be affected by, for example, a capacitance component such as the reference electrode 42. Thus, even during the second period, a residual voltage Vrs resulting from the control voltage Vp3 may be present between the reference electrode 42 and the outer pump electrode 23. In this case, for example, the voltage Vref during the second period is the sum of the voltage Vref* and the residual voltage Vrs. Since the residual voltage Vrs affects the potential of the reference electrode 42, the detection accuracy of the NOx concentration tends to improve as the residual voltage Vrs decreases. Thus, the lower the residual voltage Vrs, the more preferable it is. For example, the lower the fall voltage V10, the more preferable it is. The lower the minimum voltage Vrefmin, the more preferable it is. In addition, since the residual voltage Vrs decreases with time during the second period, a reduction in the detection accuracy of the NOx concentration tends to be suppressed more completely at a time closer to the end of the second period (in FIG. 3, time t7). Accordingly, the measurement pump cell 41 preferably detects the NOx concentration at a timing as later as possible during the second period. It is also preferable that a period required for the measurement pump cell 41 to detect the NOx concentration (e.g., the period from the detection of the voltage V2 to the detection of the value of the pump current Ip2, described above) be included in the second period. The measurement pump cell 41 preferably detects the NOx concentration in the same cycle T as that in which the control voltage Vp3 is turned on and off. This can repeatedly detect the NOx concentration at the same timing during the second period in each cycle T.

Like the measurement pump cell 41, preferably, the main pump cell 21 and the auxiliary pump cell 50 also perform the respective operations during the second period in each cycle T. For example, the main pump cell 21 preferably obtains the electromotive force V0 and performs feedback control of the pump voltage Vp0 on the basis of the obtained electromotive force V0 during the second period in each cycle T. The auxiliary pump cell 50 preferably obtains the electromotive force V1 and performs feedback control of the voltage Vp1 on the basis of the obtained electromotive force V1 during the second period in each cycle T. Accordingly, the operations of the cells 21 and 50 are also less affected by a change in the potential of the reference electrode 42 resulting from the control voltage Vp3.

Figure 4:
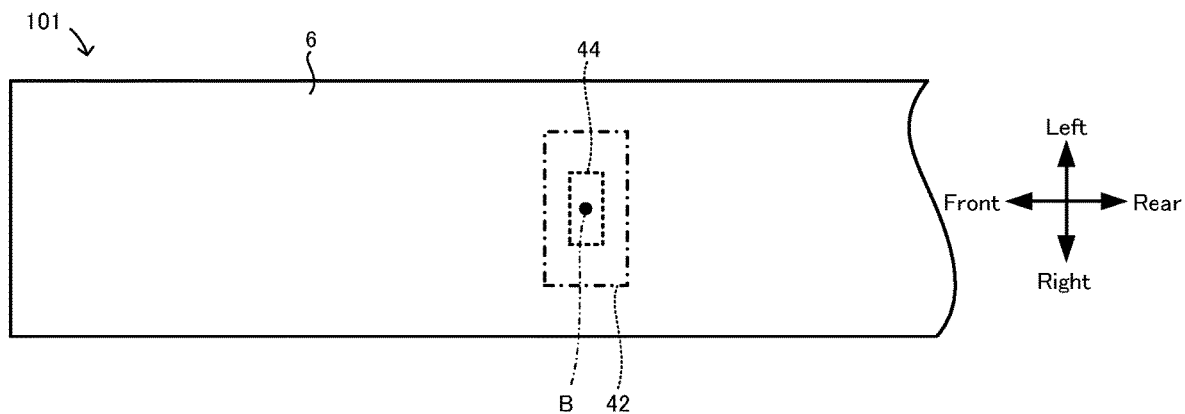
FIG. 4 is an explanatory diagram illustrating a positional relationship between a reference electrode 42 and a measurement electrode 44 in top view.
Figure 5:
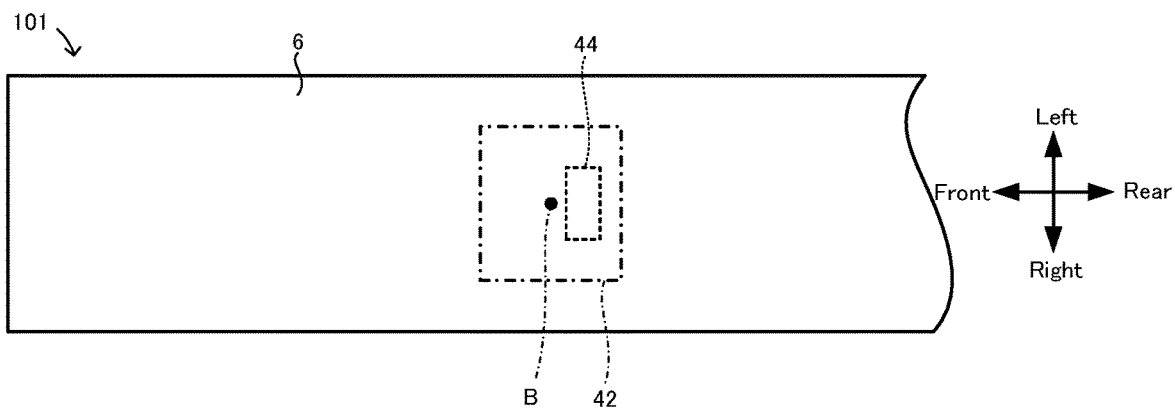
FIG. 5 is an explanatory diagram illustrating a positional relationship between the reference electrode 42 and the measurement electrode 44 in a comparative example.

The positional relationship between the reference electrode 42 and the measurement electrode 44 and their dimensions will now be described. FIG. 4 is an explanatory diagram illustrating a positional relationship between the reference electrode 42 and the measurement electrode 44 according to this embodiment in top view. FIG. 5 is an explanatory diagram illustrating a positional relationship between the reference electrode 42 and the measurement electrode 44 in a comparative example. In FIGS. 4 and 5, the sensor element 101 is virtually viewed in perspective from above. The position of the reference electrode 42 is indicated by a long dashed short dashed line, and the position of the measurement electrode 44 is indicated by a dashed line. In FIGS. 4 and 5, furthermore, the other components, such as the outer pump electrode 23, are not illustrated.

As illustrated in FIG. 4, in the gas sensor 100 according to this embodiment, as viewed in the thickness direction of the solid electrolyte layers (the layers 1 to 6) (here, in the upward direction), the reference electrode 42 and the measurement electrode 44 are arranged such that a center of gravity B of the reference electrode 42 overlaps the measurement electrode 44. That is, the center of gravity B of the reference electrode 42 is located within an area where the measurement electrode 44 is present (in FIG. 4, inside a dashed-line frame) in top view. The term "center of gravity of the reference electrode 42", as used here, refers to a center of gravity of a two-dimensional shape in top view. Accordingly, the position of the center of gravity is determined without consideration being given to variations in the thickness of the reference electrode 42 or the like. In other words, the term "center of gravity of the reference electrode 42" refers to a center of mass, assuming that the thickness of the reference electrode 42 is uniform. Since the thickness of the reference electrode 42 is much smaller than the front-rear length or left-right width thereof, the center of gravity is determined by ignoring the influence of the thickness, as described above. The same applies to the center of gravity of the measurement electrode 44.

In this embodiment, the reference electrode 42 and the measurement electrode 44 have each a rectangular shape in top view, with the sides of the rectangular shape extending to the front, rear, left, and right. In this embodiment, accordingly, the center of gravity B of the reference electrode 42 is the front-rear center and the left-right center of the reference electrode 42. As illustrated in FIG. 4, the measurement electrode 44 is arranged so as to be included in the reference electrode 42 in top view. In other words, the measurement electrode 44 is arranged so as to completely overlap the reference electrode 42 in top view. In FIG. 4, furthermore, the center of gravity B of the reference electrode 42 matches the center of gravity of the measurement electrode 44 in top view. In addition, the length of each of the reference electrode 42 and the measurement electrode 44 in the front-rear direction is less than or equal to 1.1 mm. Note that in FIG. 4, the center of gravity B of the reference electrode 42 matches that of the measurement electrode 44 in top view. However, the center of gravity B of the reference electrode 42 need not match that of the measurement electrode 44. The center of gravity B of the reference electrode 42 may overlap the measurement electrode 44. When the center of gravity B of the reference electrode 42 does not match the center of gravity of the measurement electrode 44 in top view, the distance between the center of gravity B of the reference electrode 42 and the center of gravity of the measurement electrode 44 in top view may be less than or equal to 290 μm or less than or equal to 200 μm or less than or equal to 150 μm or less than or equal to 100 μm.

As described above, the center of gravity B of the reference electrode 42 overlaps the measurement electrode 44 in top view, and the length of each of the reference electrode 42 and the measurement electrode 44 in the front-rear direction is less than or equal to 1.1 mm. This can shorten the stabilization time of the thermoelectromotive force between the reference electrode 42 and the measurement electrode 44 and decrease the steady thermoelectromotive force. This will be described hereinafter.

When in use, the sensor element 101 is heated by the heater 72 and is kept warm at a temperature at which solid electrolyte is active (e.g., 800° C.). At this time, a thermoelectromotive force is generated between the reference electrode 42 and the measurement electrode 44 due to the temperature difference therebetween. Immediately after the heater 72 starts the heating operation, the thermoelectromotive force has an unstable value due to the temperature variations of the reference electrode 42 and the measurement electrode 44. Further, the sensor element 101 has a long, rectangular parallelepiped shape, and the element body (the layers 1 to 6) has a longitudinal direction. Thus, when the element body is heated by the heater 72, the temperature variations of the element body in the longitudinal direction (front-rear direction) are larger than the temperature variations of the element body in the width direction (left-right direction). Accordingly, as the length of each of the reference electrode 42 and the measurement electrode 44 in the front-rear direction increases, the temperature variations of the electrode are more likely to increase, resulting in an increase in the time taken to make the temperatures in the electrode uniform. In contrast, the length of each of the reference electrode 42 and the measurement electrode 44 in the front-rear direction is less than or equal to 1.1 mm, thereby making the temperatures in each electrode uniform more quickly. This shortens the time taken to stabilize the thermoelectromotive force between the reference electrode 42 and the measurement electrode 44. In addition, since the center of gravity B of the reference electrode 42 overlaps the measurement electrode 44 in top view, the steady temperature difference between the reference electrode 42 and the measurement electrode 44 can be reduced, and the steady thermoelectromotive force between the reference electrode 42 and the measurement electrode 44 can be decreased. In contrast, for example, in the positional relationship in the comparative example illustrated in FIG. 5, that is, when the center of gravity B of the reference electrode 42 does not overlap the measurement electrode 44 in top view, the steady thermoelectromotive force between the reference electrode 42 and the measurement electrode 44 increases. In FIG. 5, as in FIG. 4, the measurement electrode 44 is arranged so as to be included in the reference electrode 42 in top view. Even in this case, as illustrated in FIG. 5, when the center of gravity B of the reference electrode 42 does not overlap the measurement electrode 44 in top view, the steady thermoelectromotive force between the reference electrode 42 and the measurement electrode 44 increases.

The thermoelectromotive force between the reference electrode 42 and the measurement electrode 44 is included in the voltage V2 detected by the measurement-pump-control oxygen-partial-pressure detection sensor cell 82. Thus, if the thermoelectromotive force is unstable or the steady thermoelectromotive force is large, the voltage V2 deviates from a value that would be detected otherwise, that is, a voltage value corresponding to the oxygen concentration difference between an area around the reference electrode 42 and an area around the measurement electrode 44. This results in a reduction in the detection accuracy of the NOx concentration of the gas sensor 100. In the gas sensor 100 according to this embodiment, it is possible to shorten the stabilization time of the thermoelectromotive force between the reference electrode 42 and the measurement electrode 44 and to decrease the steady thermoelectromotive force. Therefore, a reduction in the detection accuracy of the NOx concentration due to the thermoelectromotive force can be suppressed. In addition, since the stabilization time of the thermoelectromotive force can be shortened, the light-off time of the gas sensor 100 (time from when the heater 72 starts to be energized to when correct detection of the NOx concentration is available) can be shortened.

In addition, the area of the reference electrode 42 in top view is greater than or equal to 1.0 mm$^2$. This decreases the resistance value of the reference electrode 42 and can thus decrease the residual voltage Vrs (see FIG. 3) between the reference electrode 42 and the outer pump electrode 23 during the second period described above. Since the residual voltage Vrs affects the potential of the reference electrode 42, decreasing the residual voltage Vrs can suppress a reduction in the detection accuracy of the NOx concentration. The area of the reference electrode 42 in top view is preferably greater than 1.0 mm², is more preferably greater than or equal to 1.2 mm², and is further preferably greater than or equal to 1.5 mm².

The area of the reference electrode 42 in top view is preferably less than or equal to 4.0 mm². If the area of the reference electrode 42 is excessively large, it takes time to make the temperatures in the reference electrode 42 uniform, which may result in an increase in the stabilization time of the thermoelectromotive force. When the area of the reference electrode 42 is less than or equal to 4.0 mm², it is less likely to increase the stabilization time of the thermoelectromotive force.

Likewise, the area of the measurement electrode 44 in top view may also be less than or equal to 4.0 mm². The area of the measurement electrode 44 in top view is preferably greater than or equal to 0.2 mm² and less than or equal to 2.0 mm². If the area of the measurement electrode 44 is greater than or equal to 0.2 mm², the resistance value of the measurement electrode 44 is not excessively large, resulting in an increase in the value of the pump current Ip2, which is used to measure the NOx concentration, and sufficient detection accuracy of the specific gas concentration. In contrast, for example, if the resistance value of the measurement electrode 44 is excessively large, even when the NOx concentration in the measurement-object gas changes, the change in the value of the pump current Ip2 is small, resulting in a reduction in the detection accuracy of the specific gas concentration. If the area of the measurement electrode 44 is less than or equal to 2.0 mm², the resistance value of the measurement electrode 44 is not excessively small, achieving a small offset current (the pump current Ip2 that flows when the measurement-object gas contains no NOx). This also results in sufficient detection accuracy of the NOx concentration.

The distance between the reference electrode 42 and the measurement electrode 44 in the thickness direction (here, the distance in the up-down direction) is preferably greater than or equal to 50 μm and less than or equal to 500 μm. In this embodiment, this distance is the distance between an upper surface of the reference electrode 42 and a lower surface of the measurement electrode 44 in the up-down direction. When the distance between the reference electrode 42 and the measurement electrode 44 in the thickness direction is greater than or equal to 50 μm, a portion of the element body between the reference electrode 42 and the measurement electrode 44 (here, portions of the first solid electrolyte layer 4 and the air introducing layer 48) is not excessively thin. Thus, a crack is less likely to occur in the element body. A distance of less than or equal to 500 μm in the thickness direction can further decrease the steady thermoelectromotive force between the reference electrode 42 and the measurement electrode 44.

The length of the reference electrode 42 in the front-rear direction is preferably less than or equal to 1.0 mm, and is more preferably less than or equal to 0.95 mm. As the length of the reference electrode 42 in the front-rear direction decreases, the temperatures in the reference electrode 42 are made uniform more quickly. The length of the reference electrode 42 in the front-rear direction may be greater than or equal to 0.5 mm. The thickness of the reference electrode 42 may be 5 to 30 μm. The width of the reference electrode 42 in the left-right direction may be 1.0 to 4.0 mm.

The length of the measurement electrode 44 in the front-rear direction is preferably less than or equal to 1.0 mm, is more preferably less than or equal to 0.95 mm, and is further preferably less than or equal to 0.57 mm. As the length of the measurement electrode 44 in the front-rear direction decreases, the temperatures in the measurement electrode 44 are made uniform more quickly. The length of the measurement electrode 44 in the front-rear direction may be greater than or equal to 0.2 mm. The thickness of the measurement electrode 44 may be 5 to 30 μm. The width of the measurement electrode 44 in the left-right direction may be 0.5 to 2.5 mm.

A ratio Rr, which is a value obtained by dividing the length of the reference electrode 42 in the front-rear direction by the length of the reference electrode 42 in the width direction, may be greater than or equal to 0.2 and less than or equal to 0.8. The ratio Rr may be less than or equal to 0.7, less than or equal to 0.5, or less than or equal to 0.45. A ratio Rm, which is a value obtained by dividing the length of the measurement electrode 44 in the front-rear direction by the length of the measurement electrode 44 in the width direction, may be greater than or equal to 0.2 and less than or equal to 0.8. The ratio Rm may be less than or equal to 0.7, less than or equal to 0.5, or less than or equal to 0.4. In this embodiment, since the reference electrode 42 and the measurement electrode 44 have each a rectangular shape in top view, with the sides of the rectangular shape extending to the front, rear, left, and right, the ratio Rr and the ratio Rm correspond to the aspect ratios of the reference electrode 42 and the measurement electrode 44, respectively. As the ratio Rr decreases, the time required to make the temperatures in the reference electrode 42 uniform by reducing the length of the reference electrode 42 in the front-rear direction while maintaining the area of the reference electrode 42 at a suitable size can be shortened. Likewise, as the ratio Rm decreases, the time required to make the temperatures in the measurement electrode 44 uniform by reducing the length of the measurement electrode 44 in the front-rear direction while maintaining the area of the measurement electrode 44 at a suitable size can be shortened.

The correspondence between the constituent elements of this embodiment and the constituent elements of the present invention will now be clarified. The first substrate layer 1, the second substrate layer 2, the third substrate layer 3, the first solid electrolyte layer 4, the spacer layer 5, and the second solid electrolyte layer 6 of this embodiment correspond to an element body of the present invention, the measurement electrode 44 corresponds to a measurement electrode, the reference electrode 42 corresponds to a reference electrode, and the heater 72 corresponds to a heater. The outer pump electrode 23 corresponds to a measurement-object-gas-side electrode and an outer measurement electrode, the third internal cavity 61 corresponds to a measurement chamber, the reference-gas regulating pump cell 90 corresponds to a reference gas regulating device, and the measurement pump cell 41 corresponds to a detection device. The pump current Ip2 corresponds to a measurement pump current.

In the gas sensor 100 according to this embodiment described above in detail, the center of gravity B of the reference electrode 42 overlaps the measurement electrode 44 in top view, and the length of each of the reference electrode 42 and the measurement electrode 44 in the front-rear direction is less than or equal to 1.1 mm. This can shorten the stabilization time of the thermoelectromotive force between the reference electrode 42 and the measurement electrode 44 and decrease the steady thermoelectromotive force.

In addition, since the distance between the reference electrode 42 and the measurement electrode 44 in the thickness direction is greater than or equal to 50 μm, a crack is less likely to occur in the element body. Since the distance in the thickness direction is less than or equal to 500 μm, the steady thermoelectromotive force between the reference electrode 42 and the measurement electrode 44 can be reduced. Since the area of the reference electrode 42 is less than or equal to 4.0 mm$^2$, the stabilization time of the thermoelectromotive force is less likely to increase.

Furthermore, since the reference-gas regulating pump cell 90 applies the control voltage Vp3 to pump oxygen into around the reference electrode 42, the reduction in oxygen concentration around the reference electrode 42 can be compensated for. In addition, the reference-gas regulating pump cell 90 applies the control voltage Vp3, which is repeatedly turned on and off, and the measurement pump cell 41 detects the NOx concentration on the basis of the voltage V2 during the second period. This can suppress a reduction in the detection accuracy of the NOx concentration resulting from the control voltage Vp3. Since the area of the reference electrode 42 is greater than or equal to 1.0 mm$^2$, it is possible to decrease the residual voltage Vrs and suppress a reduction in the detection accuracy of the NOx concentration.

Moreover, the measurement pump cell 41 pumps out oxygen, which is produced by reducing NOx in the third internal cavity 61, from around the measurement electrode 44 to around the outer pump electrode 23 and detects the NOx concentration on the basis of the flow of the pump current Ip2 at this time. Since the area of the measurement electrode 44 is greater than or equal to 0.2 mm$^2$, the value of the pump current Ip2 increases, resulting in sufficient detection accuracy of the NOx concentration. In addition, since the area of the measurement electrode 44 is less than or equal to 2.0 mm$^2$, it is possible to decrease the offset current of the gas sensor 100.

It goes without saying that the present invention is not limited to the embodiment described above and may be implemented in various forms without departing from the technical scope of the present invention.

Figure 6:
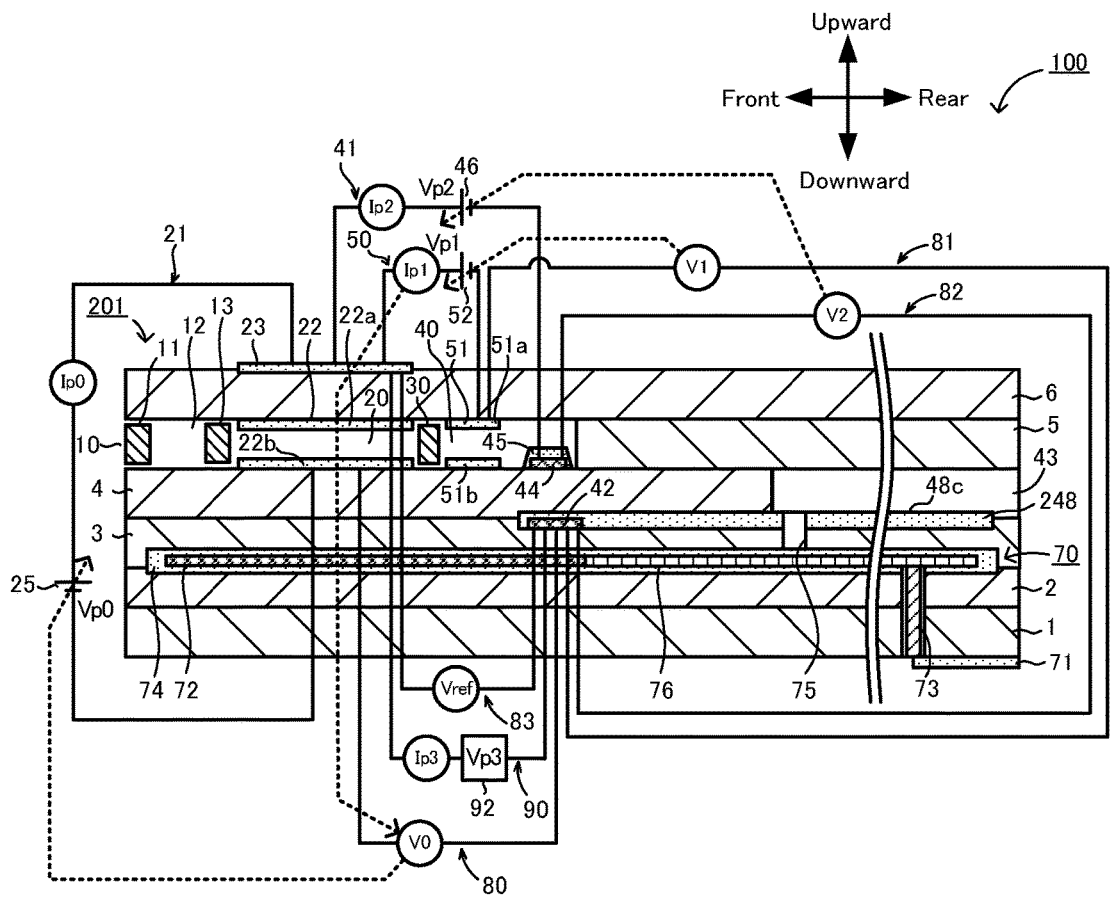
FIG. 6 is a schematic sectional view of a sensor element 201 according to a modification.

In the embodiment described above, the air introducing layer 48 is disposed across an area from the reference electrode 42 up to the rear end surface of the sensor element 101 in the longitudinal direction, although this is not intended to be limiting. FIG. 6 is a schematic sectional view of a sensor element 201 according to a modification. As illustrated in FIG. 6, the sensor element 201 includes a reference gas introducing space 43 above an air introducing layer 248. The reference gas introducing space 43 is a space disposed between the upper surface of the third substrate layer 3 and a lower surface of the spacer layer 5 at a position at which the sides of the space are defined by side surfaces of the first solid electrolyte layer 4. The reference gas introducing space 43 has a rear end that is open to a rear end surface of the sensor element 201. The reference gas introducing space 43 is disposed to the front of the pressure release hole 75 in the front-rear direction, and the pressure release hole 75 is open to the reference gas introducing space 43. Unlike the air introducing layer 48, the air introducing layer 248 is not disposed up to a rear end of the sensor element 201. Thus, the air introducing layer 248 is not exposed to the rear end surface of the sensor element 201. Instead of this, a portion of an upper surface of the air introducing layer 248 is exposed to the reference gas introducing space 43. The exposed portion serves as the inlet 48c in the air introducing layer 248. A reference gas is introduced into the air introducing layer 248 through the inlet 48c from the reference gas introducing space 43. In the sensor element 201, the air introducing layer 248 may be disposed up to the rear end of the sensor element 201 such that a rear end of the air introducing layer 248 matches the rear end of the sensor element 201.

In the embodiment described above, the sensor element 101 of the gas sensor 100 includes the first internal cavity 20, the second internal cavity 40, and the third internal cavity 61, although this is not intended to be limiting. For example, as in the sensor element 201 illustrated in FIG. 6 described above, the third internal cavity 61 may not be included. In the sensor element 201 according to the modification illustrated in FIG. 6, the gas inlet 10, the first diffusion control section 11, the buffer space 12, the second diffusion control section 13, the first internal cavity 20, the third diffusion control section 30, and the second internal cavity 40 are formed adjacent and communicate in the stated order between the lower surface of the second solid electrolyte layer 6 and the upper surface of the first solid electrolyte layer 4. The measurement electrode 44 is disposed on the upper surface of the first solid electrolyte layer 4 within the second internal cavity 40. The measurement electrode 44 is covered with a fourth diffusion control section 45. The fourth diffusion control section 45 is a film made of a porous ceramic material such as alumina ($Al_2O_3$). Like the fourth diffusion control section 60 according to the embodiment described above, the fourth diffusion control section 45 serves to limit the amount of NOx flowing into the measurement electrode 44. The fourth diffusion control section 45 also serves as a protective film of the measurement electrode 44. The ceiling electrode portion 51a of the auxiliary pump electrode 51 is formed up to a position immediately above the measurement electrode 44. In the sensor element 201 having the configuration described above, the measurement pump cell 41 is capable of detecting the NOx concentration in a way similar to that in the embodiment described above. In the sensor element 201 illustrated in FIG. 6, a portion around the measurement electrode 44 serves as a measurement chamber.

In the embodiment described above, the outer pump electrode 23 serves as an electrode (also referred to as outer measurement electrode) paired with the measurement electrode 44 of the measurement pump cell 41 and also serves as an electrode (also referred to as measurement-object-gas-side electrode) paired with the reference electrode 42 of the reference-gas regulating pump cell 90, although this is not intended to be limiting. At least one of the outer measurement electrode and the measurement-object-gas-side electrode may be disposed on the outer side of the element body, separately from the outer pump electrode 23, so as to come into contact with the measurement-object gas. In addition, the measurement-object-gas-side electrode of the reference-gas regulating pump cell 90 may be disposed in a portion of the sensor element 101 that comes into contact with the measurement-object gas, and the measurement-object-gas-side electrode may not be located on the outer side of the element body. For example, the inner pump electrode 22 may also serve as the measurement-object-gas-side electrode of the reference-gas regulating pump cell 90.

In the embodiment described above, the voltage Vp2 of the variable power supply 46 is controlled so that the voltage V2 detected by the measurement-pump-control oxygen-partial-pressure detection sensor cell 82 becomes constant, and the concentration of nitrogen oxides in the measurement-object gas is calculated using the flow of the pump current Ip2 at this time. Alternatively, any other device configured to detect a specific gas concentration in the measurement-object gas on the basis of a voltage between the reference electrode 42 and the measurement electrode 44 may be used. For example, the measurement electrode 44, the first solid electrolyte layer 4, the third substrate layer 3, and the reference electrode 42 may be used in combination to form an oxygen partial pressure detection device serving as an electrochemical sensor cell. Accordingly, a voltage corresponding to a difference between the amount of oxygen produced by reducing the NOx component in the atmosphere around the measurement electrode 44 and the amount of oxygen around the reference electrode 42 can be detected as the voltage V2, which can be used to determine the concentration of the NOx component in the measurement-object gas. In this case, this electrochemical sensor cell corresponds to a detection device of the present invention. In this manner, when the voltage V2 is detected as the value corresponding to the NOx concentration, it is preferable that the voltage Vp2 of the variable power supply 46 be controlled (e.g., the voltage Vp2 be subjected to feedback control or the voltage Vp2 be subjected to constant control) so that the pump current Ip2 becomes a constant target value Ip2*. The measurement pump cell 41 is controlled so that the pump current Ip2 becomes the target value Ip2*, thereby allowing oxygen to be pumped out of the third internal cavity 61 at a substantially constant flow rate. Thus, the oxygen concentration in the third internal cavity 61 changes in accordance with the amount of oxygen produced by reducing NOx in the measurement-object gas in the third internal cavity 61, and the voltage V2 changes accordingly. The voltage V2 is thus a value corresponding to the NOx concentration in the measurement-object gas. It is therefore possible to calculate the NOx concentration on the basis of the voltage V2.

In the embodiment described above, the reference electrode 42 is formed directly on the upper surface of the third substrate layer 3, although this is not intended to be limiting. For example, the reference electrode 42 may be formed directly on the lower surface of the first solid electrolyte layer 4. Alternatively, two or more solid electrolyte layers may be present between the reference electrode 42 and the measurement electrode 44.

In the embodiment described above, the reference gas is air. Any other gas may be used as a reference to detect the concentration of a specific gas in the measurement-object gas. For example, the space 149 may be filled with a gas that is adjusted in advance to have a predetermined oxygen concentration (>the oxygen concentration of the measurement-object gas) as a reference gas.

In the embodiment described above, the reference-gas regulating pump cell 90 applies the control voltage Vp3 to pump oxygen into around the reference electrode 42, which may be omitted. That is, the gas sensor 100 may not include the reference-gas regulating pump cell 90.

In the embodiment described above, the sensor element 101 is configured to detect the NOx concentration in the measurement-object gas. Alternatively, any other device may be used to detect the concentration of a specific gas in the measurement-object gas. For example, the concentration of oxides other than NOx may be detected as a specific gas concentration. When the specific gas is an oxide, as in the embodiment described above, the specific gas itself is reduced in the third internal cavity 61 to produce oxygen. Thus, the measurement pump cell 41 may obtain a detected value (e.g., the pump current Ip2) corresponding to the oxygen to detect the specific gas concentration. Alternatively, the specific gas may be a non-oxide such as ammonia. When the specific gas is a non-oxide, the specific gas is converted to oxide (e.g., ammonia is converted to NO) such that the converted gas is reduced in the third internal cavity 61 to produce oxygen. The measurement pump cell 41 obtains a detected value (e.g., the pump current Ip2) corresponding to the oxygen to detect the specific gas concentration. For example, the inner pump electrode 22 of the first internal cavity 20 functions as catalyst to convert ammonia to NO in the first internal cavity 20.

Figure 7:
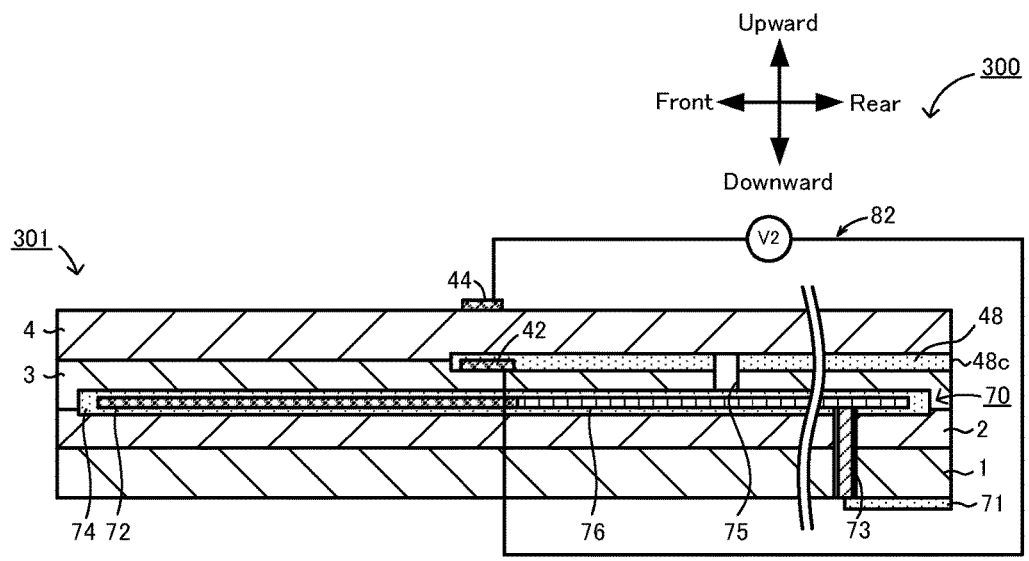
FIG. 7 is an explanatory diagram of a gas sensor 300 according to a modification.

Alternatively, the specific gas may be oxygen. FIG. 7 is an explanatory diagram of a gas sensor 300 according to a modification. In FIG. 7, the same components as those in FIG. 2 are identified by the same numerals. The gas sensor 300 according to the modification includes a sensor element 301, which does not include the spacer layer 5, the second solid electrolyte layer 6, the inner pump electrode 22, the outer pump electrode 23, the auxiliary pump electrode 51, and the measurement-object gas flow section of the sensor element 101. In the sensor element 301, the measurement electrode 44 disposed on the upper surface of the first solid electrolyte layer 4 is disposed on the outer side of the element body (the layers 1 to 4). As in the embodiment described above, the measurement electrode 44 may be a cermet electrode of Pt and $ZrO_2$ or may also contain, for example, Au or the like to achieve lowered reduction ability for the NOx component in the measurement-object gas. In the sensor element 301, an electromotive force (the voltage V2) corresponding to the oxygen concentration in the measurement-object gas is generated between the reference electrode 42 and the measurement electrode 44. The measurement-pump-control oxygen-partial-pressure detection sensor cell 82 detects the voltage V2 to detect the oxygen concentration in the measurement-object gas. Also in the gas sensor 300, the thermoelectromotive force between the reference electrode 42 and the measurement electrode 44 is included in the voltage V2. In the sensor element 301, accordingly, the center of gravity of the reference electrode 42 overlaps the measurement electrode 44 in top view, and the length of each of the reference electrode 42 and the measurement electrode 44 in the front-rear direction is less than or equal to 1.1 mm. This can shorten the stabilization time of the thermoelectromotive force between the reference electrode 42 and the measurement electrode 44 and decrease the steady thermoelectromotive force, as in the embodiment described above. In the gas sensor 300, therefore, it is possible to suppress a reduction in the detection accuracy of the oxygen concentration and to shorten the light-off time.

In the embodiment described above, the element body of the sensor element 101 is a layered body having a plurality of solid electrolyte layers (the layers 1 to 6), although this is not intended to be limiting. The element body of the sensor element 101 may include at least one oxygen-ion-conductive solid electrolyte layer. For example, in FIG. 2, the layers 1 to 5, except for the second solid electrolyte layer 6, may be layers other than a solid electrolyte layer (e.g., alumina layers). In this case, the respective electrodes of the sensor element 101 may be disposed on the second solid electrolyte layer 6. For example, the measurement electrode 44 illustrated in FIG. 2 may be disposed on the lower surface of the second solid electrolyte layer 6. The air introducing layer 48 may be disposed between the second solid electrolyte layer 6 and the spacer layer 5, instead of between the first solid electrolyte layer 4 and the third substrate layer 3, and the reference electrode 42 may be disposed to the rear of the third internal cavity 61 on the lower surface of the second solid electrolyte layer 6. Also in the sensor element 301 according to the modification illustrated in FIG. 7, the layers 1 to 3, except for the first solid electrolyte layer 4, may be layers other than a solid electrolyte layer. In this case, the reference electrode 42 may be disposed on the lower surface of the first solid electrolyte layer 4.

In the embodiment described above, the reference electrode 42 and the measurement electrode 44 have each a rectangular shape in top view, with the sides of the rectangular shape extending to the front, rear, left, and right, although this is not intended to be limiting. For example, at least one of the reference electrode 42 and the measurement electrode 44 may have a shape other than a rectangular shape, or may have a rectangular shape whose sides are not aligned with the front, rear, left, and right directions. In these cases, the length of the reference electrode 42 in the front-rear direction may be the distance from the front end to the rear end of the reference electrode 42 in the front-rear direction. The same applies to the width in the left-right direction. The same applies to the measurement electrode 44.

In the embodiment described above, the inner pump electrode 22 is a cermet electrode of Pt and $ZrO_2$ containing 1% Au, although this is not intended to be limiting. The inner pump electrode 22 may contain a catalytically active noble metal (e.g., at least one of Pt, Rh, Ir, Ru, and Pd) and a noble metal (e.g., Au) having the catalytic activity inhibition ability to inhibit the catalytic activity of the catalytically active noble metal for the specific gas. Like the inner pump electrode 22, the auxiliary pump electrode 51 may contain a catalytically active noble metal and a noble metal having the catalytic activity inhibition ability. The outer pump electrode 23, the reference electrode 42, and the measurement electrode 44 may each contain the catalytically active noble metal described above. The electrodes 22, 23, 42, 44, and 51 are each preferably formed of a cermet containing a noble metal and an oxygen-ion-conductive oxide (e.g., $ZrO_2$). However, one or more of these electrodes may not be formed of a cermet. The electrodes 22, 23, 42, 44, and 51 are each preferably porous. However, one or more of these electrodes may not be porous.

In the embodiment described above, the pump current Ip1 is used to control the electromotive force V0 of the main-pump-control oxygen-partial-pressure detection sensor cell 80, although this is not intended to be limiting. For example, feedback control of the pump voltage Vp0 may be performed on the basis of the pump current Ip1 so that the pump current Ip1 becomes a target value Ip1*. That is, the control of the electromotive force V0 based on the pump current Ip1 may be omitted, and the pump voltage Vp0 may be directly controlled (and therefore the pump current Ip0 may be controlled) on the basis of the pump current Ip1.

In the embodiment described above, the control voltage Vp3 is a voltage that is repeatedly turned on and off, although this is not intended to be limiting. For example, the control voltage Vp3 may be a constant voltage that is not repeatedly turned on and off, such as a DC voltage.

Figure 8:
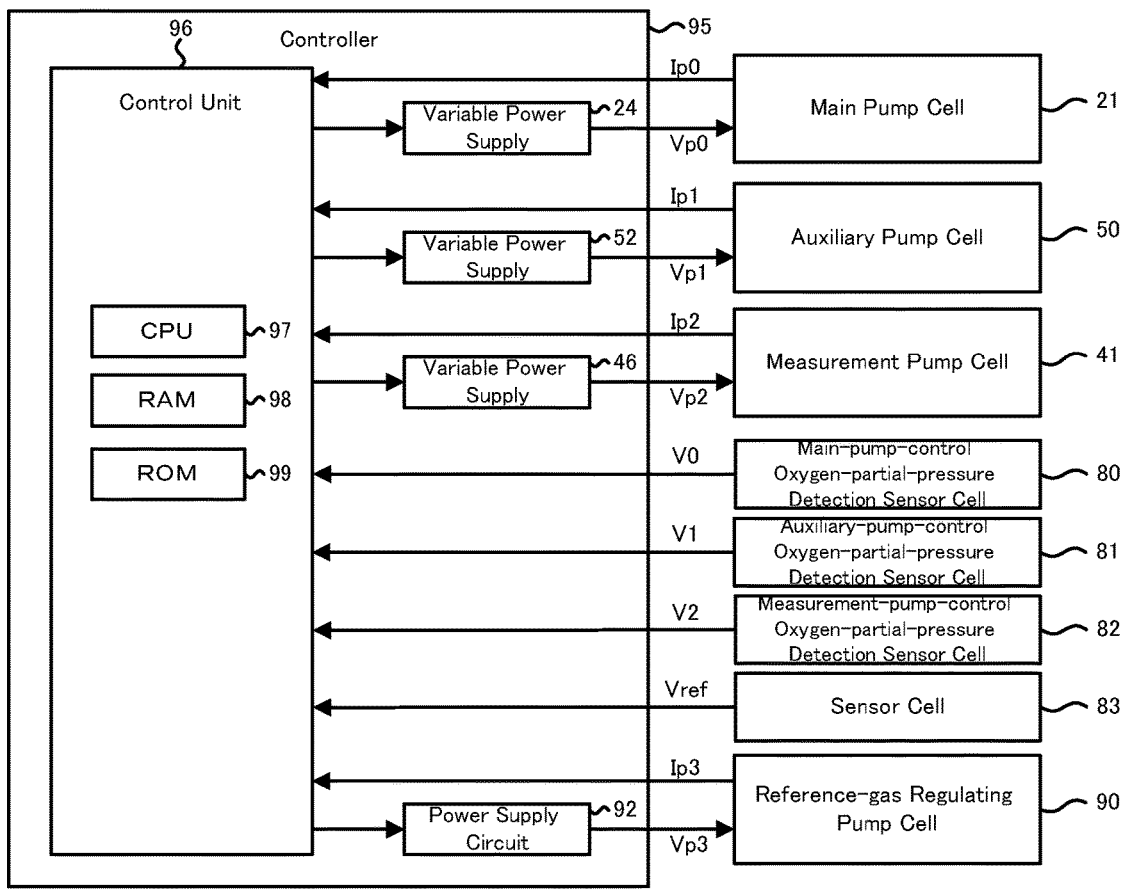
FIG. 8 is a block diagram illustrating an electrical connection relationship between a controller 95 and each cell.
Figure 9:
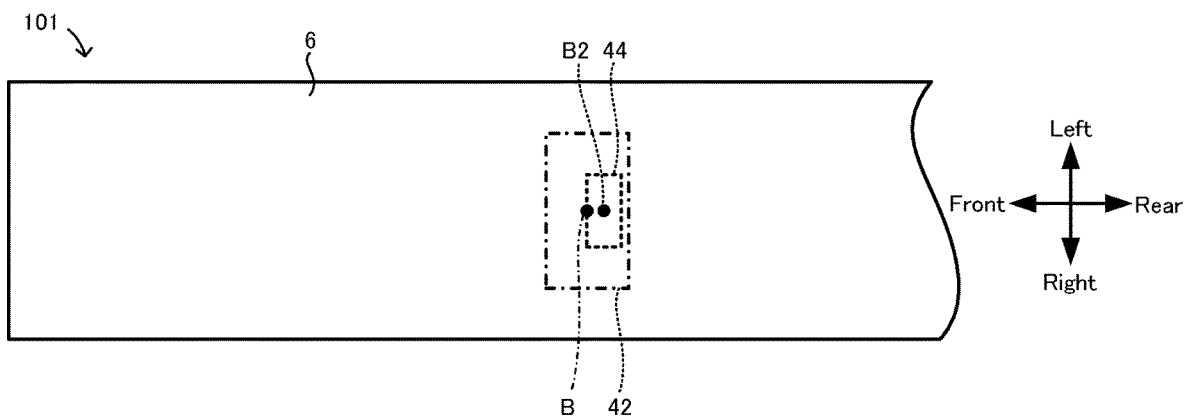
FIG. 9 is an explanatory diagram illustrating a positional relationship between a reference electrode 42 and a measurement electrode 44 in top view.

The embodiment described above does not describe a controller for controlling the cells 21, 41, 50, 80 to 83, and 90 described above and so on. The gas sensor 100 may be controlled by this controller. The controller may be identified as part of the gas sensor 100. The following describes an example of the gas sensor 100 that includes the controller. FIG. 8 is a block diagram illustrating an electrical connection relationship between a controller 95 and each cell. The controller 95 includes the variable power supplies 24, 46, and 52 and the power supply circuit 92, which are described above, and a control unit 96. The control unit 96 is configured as a microprocessor such as a CPU 97. The control unit 96 includes the CPU 97, a RAM 98 that temporarily stores data, and a ROM 99 that stores processing programs, various data, and so on. The control unit 96 receives input of the electromotive forces V0 to V2 and the voltage Vref from the sensor cells 80 to 83. The control unit 96 receives input of the pump currents Ip0 to Ip2 and the control current Ip3, which flows through the pump cells 21, 50, 41, and 90. The control unit 96 outputs control signals to the variable power supplies 24, 46, and 52 and the power supply circuit 92 to control the voltages Vp0 to Vp3 to be output from the variable power supplies 24, 46, and 52 and the power supply circuit 92, thereby controlling the pump cells 21, 41, 50, and 90. The ROM 99 stores target values V0* and V1* described below, the target value V2* described above, and so on. The ROM 99 stores information on the control voltage Vp3, which is a voltage that is repeatedly turned on and off, for example, the value of the maximum voltage Vp3max and the values of the on time Ton and the off time Toff (or the value of a duty ratio representing the proportion of the on time Ton in the cycle T). The CPU 97 of the control unit 96 refers to the information stored in the ROM 99 and controls the pump cells 21, 41, 50, and 90. The foregoing has described how the control unit 96 controls the pump cells 21, 41, 50, and 90 (i.e., how the pump cells 21, 41, 50, and 90 are controlled), which is also described hereinbelow. For example, the control unit 96 performs feedback control of the pump voltage Vp0 of the variable power supply 24 so that the electromotive force V0 becomes a target value (referred to as target value V0*) (i.e., the oxygen concentration in the first internal cavity 20 becomes a target concentration). Further, the control unit 96 performs feedback control of the voltage Vp1 of the variable power supply 52 so that the electromotive force V1 becomes a constant value (referred to as target value V1*) (i.e., the oxygen concentration in the second internal cavity 40 becomes a predetermined low oxygen concentration that does not substantially affect NOx measurement). Additionally, the control unit 96 sets (feedback control) the target value V0* of the electromotive force V0 on the basis of the pump current Ip1 so that the pump current Ip1 caused to flow by the voltage Vp1 becomes a constant value (referred to as target value Ip1*). Accordingly, the gradient of the oxygen partial pressure in the measurement-object gas introduced into the second internal cavity 40 from the third diffusion control section 30 remains always constant. In addition, the oxygen partial pressure in the atmosphere in the second internal cavity 40 is controlled to a low partial pressure that does not substantially affect NOx measurement. The target value V0* is set to a value with which the oxygen concentration in the first internal cavity 20 becomes a low oxygen concentration higher than 0%. The control unit 96 further performs feedback control of the voltage Vp2 of the variable power supply 46 on the basis of the voltage V2 (an example of a measurement voltage) so that the voltage V2 becomes the target value V2* described above (an example of a target voltage). The control unit 96 obtains the pump current Ip2 (an example of a measurement pump current) as a detected value for the oxygen produced in the third internal cavity 61 from a specific gas (here, NOx) and calculates the NOx concentration in the measurement-object gas on the basis of the pump current Ip2. The ROM 99 stores the correspondence between the pump current Ip2 and the NOx concentration, namely, a relational expression (e.g., a linear function expression), a map, and so on. The relational expression or the map may be experimentally determined in advance. The control unit 96 detects the NOx concentration in the measurement-object gas on the basis of the obtained pump current Ip2 and the correspondence stored in the ROM 99. As described above, when the control voltage Vp3 is a voltage that is repeatedly turned on and off, the control unit 96 detects the NOx concentration in the measurement-object gas on the basis of the pump current Ip2, which is obtained when the measurement pump cell 41 is controlled so that the voltage V2 obtained during the second period becomes the target value V2*.

When the gas sensor 100 includes the controller 95, the controller 95 corresponds to a measurement pump cell controller and a reference-gas regulating pump cell controller, the measurement pump cell 41 and the controller 95 correspond to a detection device, and the reference-gas regulating pump cell 90 and the controller 95 correspond to a reference gas regulating device. The measurement-pump-control oxygen-partial-pressure detection sensor cell 82 corresponds to a measurement voltage detection unit.

The description of the various modifications of the embodiment described above is applicable to the gas sensor 100 including the controller 95. For example, the control unit 96 may control the measurement pump cell 41 so that the pump current Ip2 becomes the target value Ip2* (an example of a target current), instead of controlling the measurement pump cell 41 so that the voltage V2 becomes the target value V2*, and detects the NOx concentration on the basis of the voltage V2 obtained at this time. In this case, the correspondence between the voltage V2 and the NOx concentration is stored in the ROM 99 in advance, and the control unit 96 detects the NOx concentration on the basis of the correspondence and the obtained voltage V2. In this case, furthermore, when the control voltage Vp3 is a voltage that is repeatedly turned on and off, the control unit 96 controls the measurement pump cell 41 so that the pump current Ip2 becomes the target value Ip2* (an example of a target current), and obtains the voltage V2 during the second period after this control is performed. The control unit 96 detects the NOx concentration in the measurement-object gas on the basis of the obtained voltage V2.

EXAMPLES

The following describes concrete examples of manufacturing a gas sensor as examples. Note that the present invention is not limited to the following examples.

Example 1

In Example 1, the gas sensor 100 illustrated in FIGS. 1 and 2 was produced by using the manufacturing method described above. In the production of the sensor element 101, the ceramic green sheets were formed by tape casting of a mixture of zirconia particles containing 4 mol % yttria as a stabilizer with an organic binder, a dispersing agent, a plasticizer, and an organic solvent. Compacted powders of talc were used as the green compacts 145a and 145b illustrated in FIG. 1. The air introducing layer 48 was made of ceramic of alumina. The reference electrode 42 and the measurement electrode 44 were arranged so that their centers of gravity matched in top view, as illustrated in FIG. 4. The area of the reference electrode 42 in top view was set to 1.9 mm², the length of the reference electrode 42 in the front-rear direction was set to 0.91 mm, the width of the reference electrode 42 in the left-right direction was set to 2.08 mm, and the ratio Rr was set to 0.44. The area of the measurement electrode 44 in top view was set to 0.4 mm², the length of the measurement electrode 44 in the front-rear direction was set to 0.40 mm, the width of the measurement electrode 44 in the left-right direction was set to 1.00 mm, and the ratio Rr was set to 0.40. The distance between the reference electrode 42 and the measurement electrode 44 in the thickness direction was set to 300 µm.

Examples 2 to 5, Examples 6 to 16, and Comparative Examples 1 to 5

In Examples 2 to 5, Examples 6 to 16, and Comparative Examples 1 to 5, the gas sensors 100 were produced in the same way as those in Example 1, except that the positional relationship between the reference electrode 42 and the measurement electrode 44 in top view and the dimensions of the reference electrode 42 and the measurement electrode 44 were changed in various manners as shown in Table 1. In Examples 2 to 5, Examples 6 to 11, and Comparative Examples 2 to 5, the reference electrode 42 and the measurement electrode 44 were arranged so that the center of gravity of the reference electrode 42 and the center of gravity of the measurement electrode 44 matched in top view. In Examples 12 to 16, the reference electrode 42 and the measurement electrode 44 were arranged so that the center of gravity B of the reference electrode 42 and the front end of the measurement electrode 44 matched in top view. Therefore, in Examples 12 to 16, the center of gravity B of the reference electrode 42 overlaps the measurement electrode 44 in top view. However, the center of gravity B of the reference electrode 42 does not match the center of gravity B2 of the measurement electrode 44 in top view. In Comparative Example 1, as illustrated in FIG. 5, the reference electrode 42 and the measurement electrode 44 were arranged so that the measurement electrode 44 was included in the reference electrode 42 and the center of gravity of the reference electrode 42 did not overlap the measurement electrode 44 in top view. In Examples 2 to 5, Examples 6 to 16, and Comparative Examples 1 to 5, the distance between the reference electrode 42 and the measurement electrode 44 in the thickness direction was the same as that in Example 1.

[Evaluation of Thermoelectromotive Force]

In each of the gas sensors 100 of Examples 1 to 5, Examples 6 to 16, and Comparative Examples 1 to 5, the stabilization time of the thermoelectromotive force and the steady-state thermoelectromotive force were measured. First, the variable power supplies 25, 46, and 52 and the power supply circuit 92 were set to a state of applying no voltage and were set to a state of being able to measure the open voltage (the voltage V2) between the reference electrode 42 and the measurement electrode 44. In this state, the heater 72 was started to be energized, and the voltage V2 was continuously measured. The time required to determine that the voltage V2 is stabilized is represented as the stabilization time of the thermoelectromotive force. The value measured after the voltage V2 is sufficiently stabilized is represented as the steady-state thermoelectromotive force. The evaluation is "A (good)" when the stabilization time of the thermoelectromotive force is within 5 minutes, "B (passing)" when it is more than 5 minutes and less than or equal to 10 minutes, and "F (failing)" when it is more than 10 minutes. The evaluation is "A (good)" when the steady-state thermoelectromotive force is in the range of ±15 mV, and "F (failing)" when it is outside the range of ±15 mV. Furthermore, the evaluation is "A(S) (great)" added "S" to "A" when the evaluation of the steady-state thermoelectromotive force is "A" and the steady-state thermoelectromotive force is in the range of ±7.5 mV in Table 1 which will be described below.

[Evaluation of Residual Voltage]

In each of the gas sensors 100 of Examples 1 to 5, Examples 6 to 16, and Comparative Examples 1 to 5, a residual voltage DVref [mV], which is a value obtained by measuring, in air, the minimum value of the residual voltage Vrs (=minimum voltage Vrefmin−voltage Vref*) during the second period in FIG. 3, was measured. First, the residual voltage DVref will be described. The residual voltage DVref is a value derived using Formula (1).

$$DVref = Vref1 - Vref0 \quad (1)$$

(where Vref1 denotes a minimum value [mV] of the voltage Vref in a state where the sensor element 101 is placed in air and the control voltage Vp3 is repeatedly turned on and off, and Vref0 denotes a value [mV] of the voltage Vref in a state where the sensor element 101 is placed in air and the control voltage Vp3 is not applied)

Figure 10:
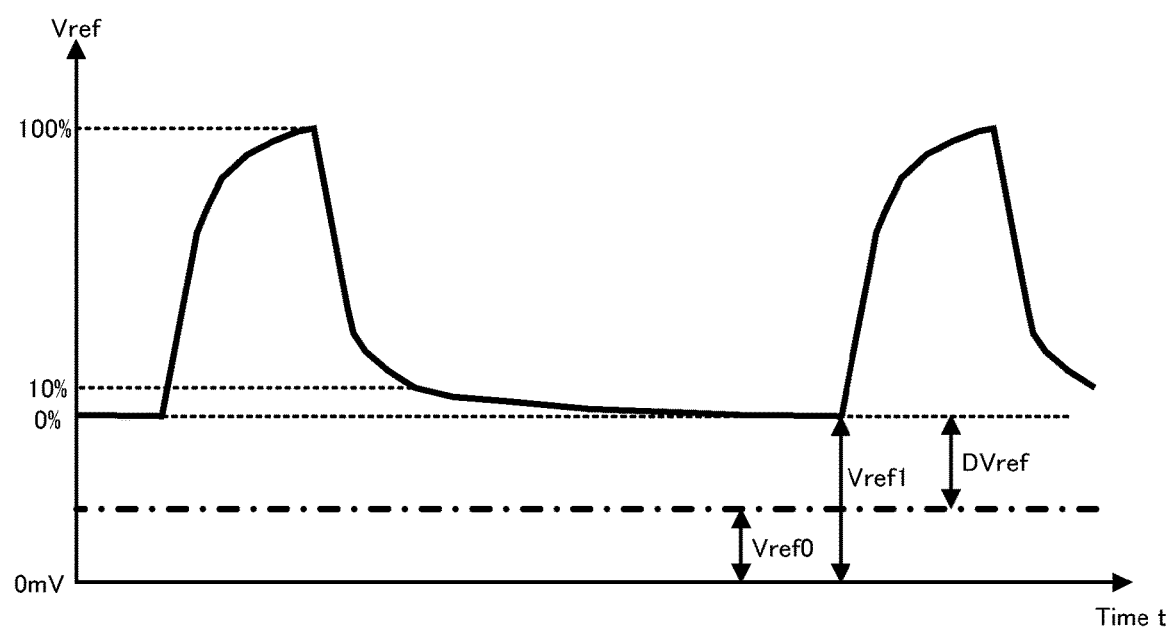
FIG. 10 is an explanatory diagram of a residual voltage DVref.

FIG. 10 is an explanatory diagram of the residual voltage DVref. As seen from the definitions described above and FIG. 10, the voltage Vref1 corresponds to a value obtained by measuring, in air, the minimum voltage Vrefmin during the second period in FIG. 3. The voltage Vref0 corresponds to a value obtained by measuring, in air, the voltage Vref* in FIG. 3. The residual voltage DVref corresponds to a value obtained by measuring, in air, the minimum value of the residual voltage Vrs (=minimum voltage Vrefmin−voltage Vref*) during the second period in FIG. 3. When the sensor element 101 is placed in air, there is no oxygen concentration difference between an area around the outer pump electrode 23 and an area around the reference electrode 42. Thus, the value of the voltage Vref0 is theoretically 0. In actuality, however, due to the influence of a thermoelectromotive force caused by a temperature difference between the outer pump electrode 23 and the reference electrode 42, the value of the voltage Vref0 is not 0. The residual voltage DVref is a value obtained by subtracting the voltage Vref0 from the voltage Vref1 and is thus measured as a value that is not affected by the thermoelectromotive force between the outer pump electrode 23 and the reference electrode 42. The residual voltage DVref is proportional to the residual voltage Vrs in FIG. 3. Since it is difficult to accurately measure the voltage Vref* in FIG. 3, it is difficult to directly measure the residual voltage Vrs. Measuring the residual voltage DVref in air provides indirect evaluation of the residual voltage Vrs.

The voltages Vref0 and Vref1 were measured in the following way. First, the sensor element 101 was placed in air, and the heater 72 was energized to heat the sensor element 101 to a predetermined driving temperature (e.g., 800° C.). The variable power supplies 25, 46, and 52 and the power supply circuit 92 were set to a state of applying no voltage. Then, after the temperature of the sensor element 101 was stabilized, the voltage Vref was measured, and the value thereof was set as the voltage Vref0. Then, the power supply circuit 92 started to turn on and off the control voltage Vp3 so as to start pumping-in of oxygen from the outer pump electrode 23 to the reference electrode 42. The control voltage Vp3 applied by the power supply circuit 92 of the reference-gas regulating pump cell 90 was set as a pulse voltage with the cycle T being 10 msec, the on time Ton being 2.0 msec, and the off time Toff being 8.0 msec. The maximum value (maximum voltage Vp3max) of the control voltage Vp3 applied by the power supply circuit 92 was set to a value with which a peak current Ip3max caused to flow through the reference electrode 42 by the control voltage Vp3 became 100 μA. The voltage Vref during the second period after 1 minute after the pumping-in of oxygen was started was measured, and a minimum value thereof was set as the voltage Vref1. The residual voltage DVref was derived using Formula (1). An average value of the residual voltage DVref was derived by measurement performed six times. The evaluation is "A (good)" when the average value of the residual voltage DVref is less than or equal to 10 mV, "B (passing)" when it is greater than 10 mV and less than or equal to 20 mV, and "F (failing)" when it is greater than 20 mV.

Table 1 shows the positional relationship between the reference electrode 42 and the measurement electrode 44, the area of the reference electrode 42, the length of the reference electrode 42 in the front-rear direction, the width of the reference electrode 42 in the left-right direction, the ratio Rr for the reference electrode 42, the area of the measurement electrode 44, the length of the measurement electrode 44 in the front-rear direction, the width of the measurement electrode 44 in the left-right direction, the ratio Rm for the measurement electrode 44, the evaluation result of the stabilization time of the thermoelectromotive force, the evaluation result of the steady thermoelectromotive force, and the evaluation result of the residual voltage DVref in Examples 1 to 5, Examples 6 to 16, and Comparative Examples 1 to 5. In Table 1, the positional relationship between the reference electrode 42 and the measurement electrode 44 is indicated by "A" when the center of gravity of the reference electrode 42 overlaps the measurement electrode 44, and "F" when the center of gravity of the reference electrode 42 does not overlap the measurement electrode 44. Furthermore, the positional relationship between the reference electrode 42 and the measurement electrode 44 is indicated by "A(S)" added "S" to "A" when the positional relationship between the reference electrode 42 and the measurement electrode 44 is "A" and the center of gravity of the reference electrode 42 matches that of the measurement electrode 44.

TABLE 1

|  | Positional Relationship between reference electrode and measurement electrode | Reference Electrode | | | | Measurement Electrode | | | | Evaluation of stabilization time of thermoelectromotive force | Evaluation of steady thermoelectromotive force | Evaluation of residual voltage DVref |
|---|---|---|---|---|---|---|---|---|---|---|---|---|
|  |  | Area [mm²] | Length [mm] | Width [mm] | Ratio Rr | Area [mm²] | Length [mm] | Width [mm] | Ratio Rm |  |  |  |
| Example 1 | A(S) | 1.9 | 0.91 | 2.08 | 0.44 | 0.4 | 0.40 | 1.00 | 0.40 | A | A(S) | A |
| Example 2 | A(S) | 1.2 | 0.90 | 1.31 | 0.69 | 0.4 | 0.40 | 1.00 | 0.40 | A | A(S) | A |
| Example 3 | A(S) | 1.0 | 0.89 | 1.12 | 0.80 | 0.4 | 0.57 | 0.71 | 0.80 | A | A(S) | B |
| Example 4 | A(S) | 1.3 | 0.50 | 2.50 | 0.20 | 0.4 | 0.28 | 1.41 | 0.20 | A | A(S) | A |
| Example 5 | A(S) | 4.0 | 1.10 | 3.65 | 0.30 | 0.4 | 0.20 | 2.00 | 0.10 | B | A(S) | A |
| Example 6 | A(S) | 1.9 | 0.91 | 2.08 | 0.44 | 0.5 | 0.48 | 1.08 | 0.44 | A | A(S) | A |

TABLE 1-continued

| | Positional Relationship between reference electrode and measurement electrode | Reference Electrode | | | | Measurement Electrode | | | | Evaluation of stabilization time of thermo-electromotive force | Evaluation of steady thermoelec-tromotive force | Evaluation of residual voltage DVref |
|---|---|---|---|---|---|---|---|---|---|---|---|---|
| | | Area [mm²] | Length [mm] | Width [mm] | Ratio Rr | Area [mm²] | Length [mm] | Width [mm] | Ratio Rm | | | |
| Example 7 | A(S) | 1.9 | 0.91 | 2.08 | 0.44 | 0.7 | 0.60 | 1.20 | 0.50 | A | A(S) | A |
| Example 8 | A(S) | 1.9 | 0.91 | 2.08 | 0.44 | 0.2 | 0.28 | 0.71 | 0.39 | A | A(S) | A |
| Example 9 | A(S) | 1.0 | 0.89 | 1.12 | 0.80 | 0.5 | 0.48 | 1.08 | 0.44 | A | A(S) | B |
| Example 10 | A(S) | 1.0 | 0.89 | 1.12 | 0.80 | 0.7 | 0.60 | 1.20 | 0.50 | A | A(S) | B |
| Example 11 | A(S) | 1.0 | 0.89 | 1.12 | 0.80 | 0.2 | 0.28 | 0.71 | 0.39 | A | A(S) | B |
| Example 12 | A | 1.9 | 0.91 | 2.08 | 0.44 | 0.4 | 0.40 | 1.00 | 0.40 | A | A | A |
| Example 13 | A | 1.2 | 0.90 | 1.31 | 0.69 | 0.4 | 0.40 | 1.00 | 0.40 | A | A | A |
| Example 14 | A | 1.0 | 0.89 | 1.12 | 0.80 | 0.4 | 0.57 | 0.71 | 0.80 | A | A | B |
| Example 15 | A | 1.3 | 0.50 | 2.50 | 0.20 | 0.4 | 0.28 | 1.41 | 0.20 | A | A(S) | A |
| Example 16 | A | 4.0 | 1.10 | 3.65 | 0.30 | 0.4 | 0.20 | 2.00 | 0.10 | B | A(S) | A |
| Comparative Example 1 | F | 3.9 | 1.87 | 2.06 | 0.91 | 0.4 | 0.45 | 0.89 | 0.50 | F | F | A |
| Comparative Example 2 | A(S) | 0.6 | 0.77 | 0.77 | 1.00 | 0.4 | 0.40 | 1.00 | 0.40 | A | A(S) | F |
| Comparative Example 3 | A(S) | 1.8 | 2.14 | 0.86 | 2.49 | 0.4 | 0.40 | 1.00 | 0.40 | F | A(S) | A |
| Comparative Example 4 | A(S) | 1.8 | 1.36 | 1.36 | 1.00 | 0.4 | 0.28 | 1.41 | 0.20 | F | A(S) | A |
| Comparative Example 5 | A(S) | 1.2 | 1.20 | 1.00 | 1.20 | 0.4 | 0.40 | 1.00 | 0.40 | F | A(S) | A |

As seen from Table 1, the evaluation of the steady thermoelectromotive force is A in Examples 1 to 5, Examples 6 to 16, and Comparative Examples 2 to 5 in which the center of gravity of the reference electrode 42 overlaps the measurement electrode 44 in top view. In contrast, the evaluation of the steady thermoelectromotive force is F in Comparative Example 1 in which the center of gravity of the reference electrode 42 does not overlap the measurement electrode 44 in top view. These results indicate that making the center of gravity of the reference electrode 42 overlap the measurement electrode 44 can reduce the steady thermoelectromotive force. The evaluation of the steady thermoelectromotive force is A(S) in Examples 1 to 11 and Comparative Examples 2 to 5 in which the center of gravity of the reference electrode 42 matches that of the measurement electrode 44. In Examples 12 to 16 in which the center of gravity of the reference electrode 42 does not match that of the measurement electrode 44, the evaluation of the steady thermoelectromotive force is A(S) in Examples 15 and 16 in which the distance between each center of gravity is relatively short. These results indicate that the shorter the distance between the center of gravity of the reference electrode 42 and that of the measurement electrode 44 is, the more decreased the steady thermoelectromotive force is. Note that in each of Examples 12 to 16, the distance between the center of gravity of the reference electrode 42 and that of the measurement electrode 44 in top view is equal to half the length of the measurement electrode.

In addition, the evaluation of the stabilization time of the thermoelectromotive force is A or B in Examples 1 to 5, Examples 6 to 16, and Comparative Example 2 in which the length of each of the reference electrode 42 and the measurement electrode 44 in the front-rear direction is less than or equal to 1.1 mm. In particular, in Examples 1 to 4, Examples 6 to 15, and Comparative Example 2 in which the length of each of the reference electrode 42 and the measurement electrode 44 in the front-rear direction is less than 1.0 mm, the evaluation of the stabilization time of the thermoelectromotive force is A. In contrast, in Comparative Examples 1 and 3 to 5 in which the length of the reference electrode 42 in the front-rear direction is greater than 1.1 mm, the evaluation of the stabilization time of the thermoelectromotive force is F.

The results described above indicate that making the center of gravity of the reference electrode 42 overlap the measurement electrode 44 in top view and setting the length of each of the reference electrode 42 and the measurement electrode 44 in the front-rear direction to be less than or equal to 1.1 mm can shorten the stabilization time of the thermoelectromotive force between the reference electrode 42 and the measurement electrode 44 and decrease the steady thermoelectromotive force. It is also indicated that the length of each of the reference electrode 42 and the measurement electrode 44 in the front-rear direction is preferably less than or equal to 1.0 mm, and is more preferably less than or equal to 0.95 mm.

In addition, a tendency is found that as the area of the reference electrode 42 increases, the residual voltage DVref decreases (and therefore the residual voltage Vrs also decreases). Specifically, the evaluation of the residual voltage is F for Comparative Example 2 in which the area of the reference electrode 42 is less than 1.0 mm², the evaluation of the residual voltage is B for Examples 3 and 9 to 11, 14 in which the area of the reference electrode 42 is equal to 1.0 mm², and the evaluation of the residual voltage is A for Examples 1, 2, 4, 5, and 6 to 8, 12, 13, 15, 16 and Comparative Examples 1 and 3 to 5 in which the area of the reference electrode 42 is greater than 1.0 mm². These results indicate that the area of the reference electrode 42 is preferably greater than or equal to 1.0 mm², and is preferably greater than 1.0 mm².

What is claimed is:
1. A sensor element for detecting a specific gas concentration in a measurement-object gas, the sensor element comprising:
   an element body including an oxygen-ion-conductive solid electrolyte layer, the element body having a longitudinal direction;

a measurement electrode disposed in the element body so as to come into contact with the measurement-object gas;

a reference electrode disposed in the element body so as to come into contact with a reference gas, the reference gas being used as a reference to detect the specific gas concentration in the measurement-object gas; and a heater disposed in the element body and configured to heat the solid electrolyte layer, wherein a center of gravity of the reference electrode overlaps the measurement electrode as viewed in a thickness direction of the solid electrolyte layer, a length of each of the reference electrode and the measurement electrode in a front-rear direction is less than or equal to 1.1 mm, the front-rear direction being a direction along the longitudinal direction of the element body, and an area of the reference electrode as viewed in the thickness direction is greater than or equal to 1.0 mm$^2$.

2. The sensor element according to claim 1, wherein
a distance between the reference electrode and the measurement electrode in the thickness direction is greater than or equal to 50 μm and less than or equal to 500 μm.

3. The sensor element according to claim 1, wherein
the area of the reference electrode is also less than or equal to 4.0 mm$^2$.

4. The sensor element according to claim 1, wherein
the length of the reference electrode is also greater than or equal to 0.5 mm.

5. The sensor element according to claim 1, wherein
the length of the measurement electrode is also greater than or equal to 0.2 mm.

6. The sensor element according to claim 1, wherein
the reference electrode has a ratio Rr of greater than or equal to 0.2 and less than or equal to 0.8, the ratio Rr being a value obtained by dividing the length of the reference electrode in the front-rear direction by a length of the reference electrode in a width direction, the width direction being a direction perpendicular to the front-rear direction and the thickness direction.

7. The sensor element according to claim 1, wherein
the measurement electrode has a ratio Rm of greater than or equal to 0.2 and less than or equal to 0.8, the ratio Rm being a value obtained by dividing the length of the measurement electrode in the front-rear direction by a length of the measurement electrode in a width direction, the width direction being a direction perpendicular to the front-rear direction and the thickness direction.

8. A gas sensor comprising:
the sensor element according to claim 1,
the sensor element including a measurement-object-gas-side electrode disposed in or out of the element body so as to come into contact with the measurement-object gas, the element body having disposed therein a measurement-object gas flow section extending from a gas inlet of the sensor element to a measurement chamber in which the measurement electrode is disposed, the measurement-object gas flow section being configured to allow the measurement-object gas to be introduced thereinto and to flow therethrough, a reference-gas regulating pump cell and a reference-gas regulating pump cell controller that is configured to control the reference-gas regulating pump cell to apply a control voltage between the reference electrode and the measurement-object-gas-side electrode to pump oxygen into around the reference electrode, the control voltage being repeatedly turned on and off; and a measurement pump cell and a measurement pump cell controller that is configured to control the measurement pump cell to detect the specific gas concentration in the measurement-object gas on the basis of a voltage between the reference electrode and the measurement electrode during a second period among a first period and the second period, the first period being a period which begins in response to turning on of the control voltage and during which a potential difference between the reference electrode and the measurement-object-gas-side electrode is large, the second period being a period which begins in response to turning off of the control voltage and in which the potential difference has fallen relative to the potential difference during the first period, wherein the sensor element further includes a measurement voltage detection sensor cell including the reference electrode and the measurement electrode and configured to detect a measurement voltage that is the voltage between the reference electrode and the measurement electrode, wherein the measurement pump cell includes the measurement electrode and an outer measurement electrode disposed on an outer side of the element body so as to come into contact with the measurement-object gas, and wherein the reference-gas regulating pump cell includes the reference electrode and the measurement-object-gas-side electrode, and wherein the measurement pump cell controller is configured to control the measurement pump cell on the basis of the measurement voltage obtained during the second period so that the measurement voltage obtained during the second period becomes a target voltage, obtain a measurement pump current that flows when the measurement pump cell pumps out oxygen, which is produced around the measurement electrode from the specific gas, from around the measurement electrode to around the outer measurement electrode in accordance with the control, and detect the specific gas concentration in the measurement-object gas on the basis of the measurement pump current, or control the measurement pump cell so that the measurement pump current becomes a target current, and detects the specific gas concentration in the measurement-object gas on the basis of the measurement voltage obtained during the second period after the control is performed.

9. The gas sensor according to claim 8, wherein
an area of the measurement electrode as viewed in the thickness direction is greater than or equal to 0.2 mm$^2$ and less than or equal to 2.0 mm$^2$.

* * * * *